(12) United States Patent
Martin-Neira

(10) Patent No.: US 10,416,313 B2
(45) Date of Patent: Sep. 17, 2019

(54) INTERFEROMETRIC RADIO OCCULTATION

(71) Applicant: European Space Agency, Paris (FR)

(72) Inventor: Manuel Martin-Neira, Oegstgeest (NL)

(73) Assignee: European Space Agency, Paris (FR)

(*) Notice: Subject to any disclaimer, the term of this patent is extended or adjusted under 35 U.S.C. 154(b) by 477 days.

(21) Appl. No.: 15/148,906

(22) Filed: May 6, 2016

(65) Prior Publication Data

US 2016/0327686 A1    Nov. 10, 2016

(30) Foreign Application Priority Data

May 8, 2015   (GB) .................................. 1507880.1

(51) Int. Cl.

| | |
|---|---|
| *G01S 19/14* | (2010.01) |
| *G01W 1/00* | (2006.01) |
| *G01S 3/46* | (2006.01) |
| *G01S 3/48* | (2006.01) |
| *G01W 1/08* | (2006.01) |

(52) U.S. Cl.
CPC ................ *G01S 19/14* (2013.01); *G01W 1/00* (2013.01); *G01S 3/46* (2013.01); *G01S 3/48* (2013.01); *G01W 1/08* (2013.01)

(58) Field of Classification Search
CPC ................ G01S 3/46; G01S 3/48; G01S 19/14
USPC ........................ 342/357.52, 357.78, 418, 424
See application file for complete search history.

(56) References Cited

U.S. PATENT DOCUMENTS

| | | | | |
|---|---|---|---|---|
| 6,067,852 A | * | 5/2000 | Alber ..................... | G01S 19/07 73/178 R |
| 6,720,916 B2 | * | 4/2004 | Christensen ............ | G01S 19/14 342/357.52 |

(Continued)

FOREIGN PATENT DOCUMENTS

| | | |
|---|---|---|
| EP | 1 243 940 A2 | 9/2002 |
| GB | 2 450 407 A | 12/2008 |

(Continued)

OTHER PUBLICATIONS

Combined Search and Examination Report for Application No. GB1507880.1, dated Nov. 10, 2015, 7 pgs.

(Continued)

*Primary Examiner* — Chuong P Nguyen
(74) *Attorney, Agent, or Firm* — Seed Intellectual Property Law Group LLP

(57) ABSTRACT

A method of performing radio occultation for inferring physical properties of a portion of atmosphere includes receiving, at a receiver, a first signal from a satellite at a first timing; receiving, at the receiver, a second signal from the satellite at a second timing different from the first timing; correlating the first signal with the second signal; and determining a first quantity indicative of a path delay between the first signal and the second signal resulting from at least one of the first signal and the second signal having passed through the portion of atmosphere between transmission by the satellite and reception at the receiver, based on a result of the correlation. The application further relates to a system for performing radio occultation for inferring physical properties of a portion of atmosphere.

20 Claims, 8 Drawing Sheets

(56) References Cited

U.S. PATENT DOCUMENTS

| | | | | |
|---|---|---|---|---|
| 6,731,906 | B2* | 5/2004 | Sokolovskiy | G01S 19/14 455/12.1 |
| 7,197,381 | B2* | 3/2007 | Sheikh | B64G 1/36 250/203.1 |
| 7,728,759 | B2* | 6/2010 | Tillotson | G01S 19/14 342/26 A |
| 7,912,422 | B2* | 3/2011 | Rocken | G01S 19/14 455/12.1 |
| 9,971,062 | B2* | 5/2018 | Platzer | G01W 1/10 |
| 10,009,101 | B2* | 6/2018 | Everett | H04B 10/118 |
| 2002/0130813 | A1* | 9/2002 | Neira | G01S 13/003 342/462 |
| 2002/0155809 | A1* | 10/2002 | Sokolovskiy | G01S 19/14 455/12.1 |
| 2007/0162197 | A1* | 7/2007 | Fleming | G01C 23/00 701/10 |
| 2008/0312836 | A1* | 12/2008 | Tillotson | G01K 11/00 702/3 |
| 2010/0063733 | A1* | 3/2010 | Yunck | G01S 13/9023 701/469 |
| 2015/0192696 | A1* | 7/2015 | Platzer | G01W 1/10 342/26 A |

FOREIGN PATENT DOCUMENTS

| | | |
|---|---|---|
| JP | 2003-202384 A | 7/2003 |
| JP | 2006-258568 A | 9/2006 |
| WO | 2004/095055 A1 | 11/2004 |
| WO | 2008/016914 A2 | 2/2008 |

OTHER PUBLICATIONS

Kursinski et al., "Observing Earth's atmosphere with radio occultation measurements using the Global Positioning System," Journal of Geophysical Research, vol. 102, No. D19, pp. 23,429-23,465—Oct. 20, 1997, 37 pgs.

International Search Report for EP Application No. 16168239.8, dated Sep. 5, 2016, 7 pgs.

Fjeldbo, "Bistatic-Radar Methods for Studying Planetary Ionospheres and Surfaces," Final Report, Prepared under National Science Foundation Grant NsF G-21543, and Scientific Report No. 2, Prepared under National Aeronautics and Space Administration Research Grant No. NsG-377, 99 pages, 1964.

Hajj et al., "CHAMP and SAC-C atmospheric occultation results and intercomparisons," *Journal of Geophysical Research* 109(D06109), 24 pages, 2004.

Hajj et al., "Initial Results of GPS-LEO Occultation Measurements of Earth's Atmosphere Obtained with the GPS-MET Experiment," *GPS Trends in Precise Terrestrial, Airborne, and Spaceborne Applications* 115:144-153, 1996.

Mariner Stanford Group, "Venus: Ionosphere and Atmosphere as Measured by Dual-Frequency Radio Occultation of Mariner V," *Science* 158(3809):1678-1683, 1967.

Martín-Neira et al., "The PARIS Ocean Altimeter In-Orbit Demonstrator," *IEEE Transactions on Geoscience and Remote Sensing* 49(6):2209-2237, 2011.

Wickert et al., "GPS radio occultation with CHAMP: First results and status of the experiment," *International Association of Geodesy Symposia* 125:273-278, 2001.

Wickert et al., "GPS radio occultation with CHAMP and GRACE: A first look at a new and promising satellite configuration for global atmospheric sounding," *Annales Geophysicae* 23: 653-658, 2005.

Yunck et al., "A History of GPS Sounding," *TAO* 11(1):1-20, 2000.

Yunck et al., "The Role of GPS in Precise Earth Observation," *IEEE Position Location and Navigation Symposium, Navigation into the 21st Century. IEEE Plans* '88:251-258, 1988.

* cited by examiner

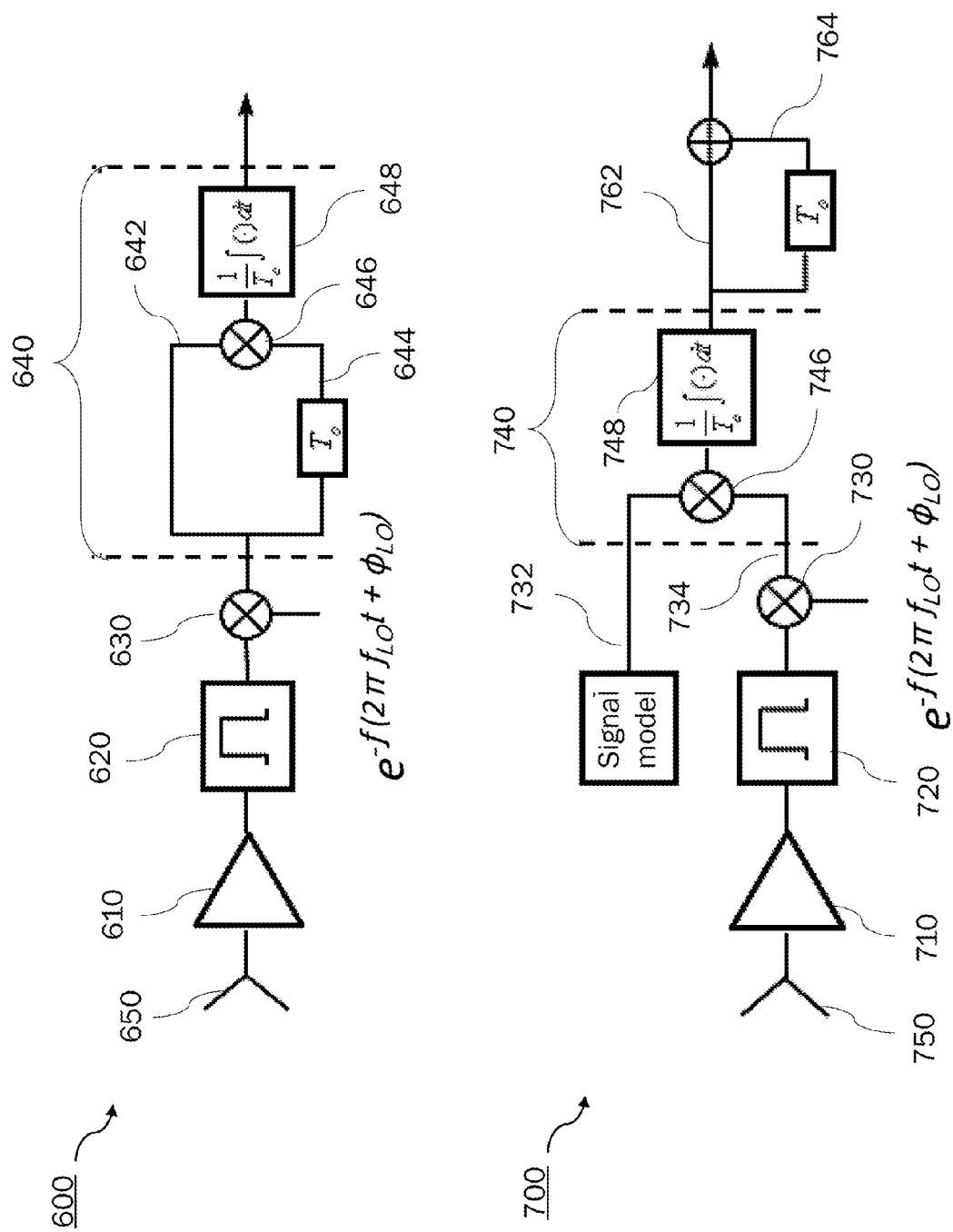

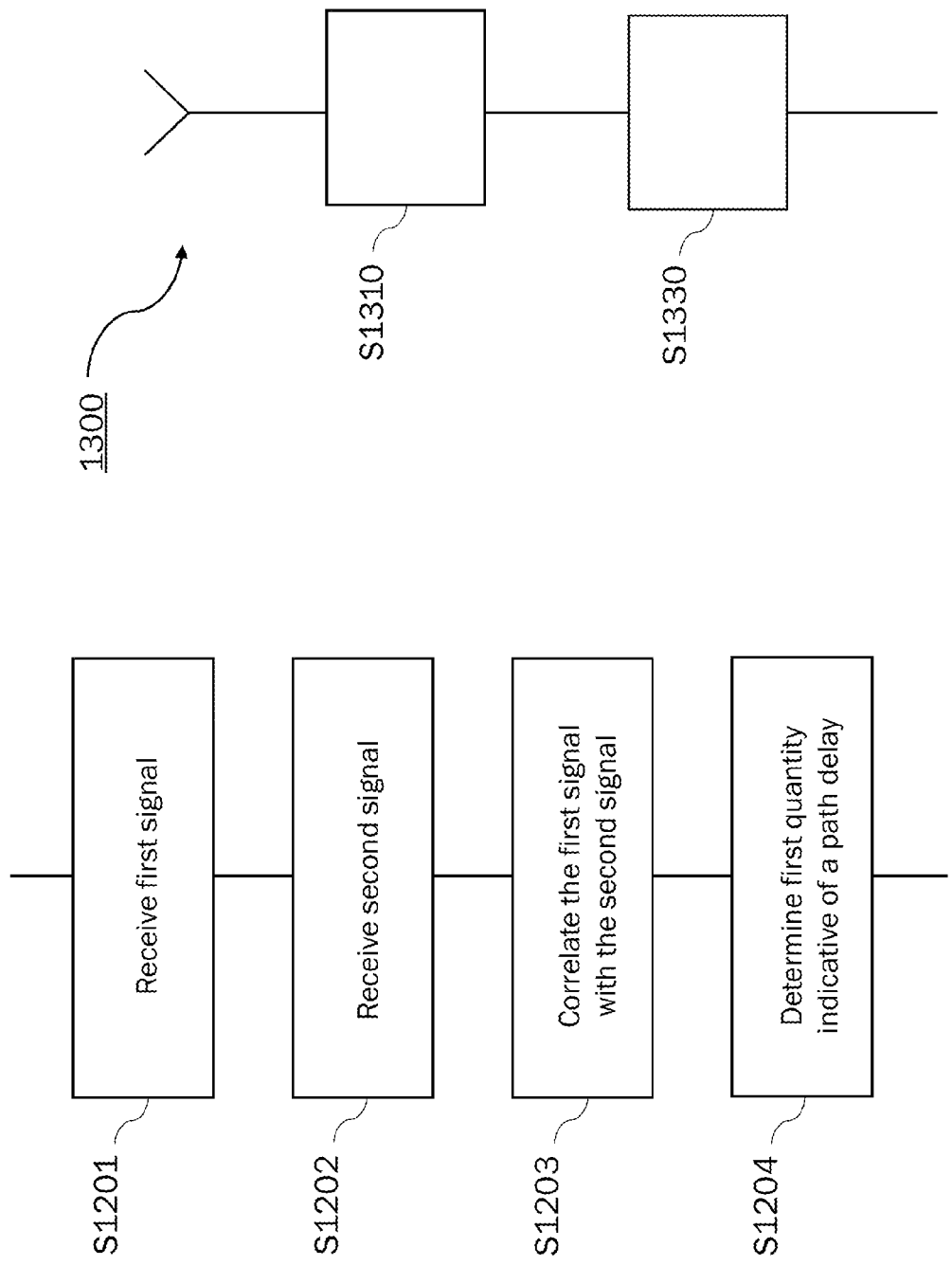

INTEROMETRIC RADIO OCCULTATION

CROSS-REFERENCE TO RELATED APPLICATIONS

The present application claims priority under 35 U.S.C. § 119 of British Application No. 1507880.1, filed on May 8, 2015, the disclosure of which is expressly incorporated by reference herein in its entirety.

BACKGROUND

1. Technical Field

This application relates to methods and systems for performing radio occultation (RO) for inferring physical properties of a portion of atmosphere, e.g., of a portion of Earth's atmosphere, by receiving signals from Global Navigation Satellite System (GNSS) satellites.

2. Description of the Related Art

Radio occultation using GPS signals was proposed by the Jet Propulsion Laboratory (JPL) in 1988, based on experience gained from several planetary missions. The first radio occultation experiment was carried out by the GPS Meteorological mission (GPS/MET), launched in 1995. Other missions followed GPS/MET, such as the Challenging Minisatellite Payload (CHAMP) and the Satellite de Aplicaciones Cientificas-C (SAC-C) in 2000, and the Gravity Recovery and Climate Experiment (GRACE-A) in 2002, to name the very early ones.

Currently there is a number of space-borne missions, even full constellations, carrying (or planned to carry in the near future) radio occultation payloads using not only signals from GPS but also from other GNSS systems, referred to as GNSS-RO payloads. Examples are the FORMOSAT/COSMIC constellation, the EUMETSAT-ESA's meteorological METOP series or the EU-ESA's Global Monitoring for Environmental Security Sentinel satellites.

However, the above missions require provision of a dedicated system aboard respective spacecraft for performing radio occultation, including dedicated antennas and dedicated signal processing circuitry as well as other electronic components. In view of increasingly tight constraints on the mass budget and volume budget for scientific payload in upcoming spaceborne missions, there is a need for an alternative radio occultation technique, and for a system performing such radio occultation technique. There is a further need for a radio occultation technique that may be performed using already existing infrastructure, and for a system performing such radio occultation technique.

BRIEF SUMMARY

In view of this need, the present document proposes a method of performing radio occultation and a system for performing radio occultation having the features of the respective independent claims.

An aspect of the disclosure relates to a method of performing radio occultation for inferring physical properties of a portion of atmosphere. The method may comprise receiving, at a receiver, a first signal from a satellite at a first timing. The first signal may be a complex-valued signal. The method may further comprise receiving, at the receiver, a second signal from the satellite at a second timing different from the first timing. The second signal may be a complex-valued signal. The first signal may be used as a reference signal for the second signal, or vice versa. The method may further comprise correlating (e.g., complex correlating) the first signal with the second signal. The method may yet further comprise determining a first quantity indicative of a path delay between the first signal and the second signal resulting from at least one of the first signal and the second signal having passed through the portion of atmosphere between transmission by the satellite and reception at the receiver, based on a result of the correlation (e.g., complex correlation). Therein, a total path delay between the first and second signals may have a component resulting from different positions of the satellite at respective times of transmission of the first and second signals that are respectively received at the first and second timings, as well as a component resulting from at least one of the first and second signals having passed through the portion of atmosphere.

As indicated above, the satellite position at the time of transmission of the first signal may be different from the satellite position at the time of transmission of the second signal. Thus, when indicating the time of transmission of the first signal as a third timing, and indicating the time of transmission of the second signal as a fourth timing, the third timing may be different from the fourth timing.

Configured as above, the method may be implemented using the same instrument (comprising for example an antenna and signal processing circuitry) as is used for interferometric altimetry. Additional circuitry for generating reference signals (i.e., clean replicas of specific code) is not required. Thus, the method may be employed as an add-on using an already existing instrument for interferometric altimetry. By re-using the existing instrument, a total mass and volume of a spacecraft's payload performing multiple experiments can be reduced, which helps meeting the increasingly constrained mass and volume budgets for state of the art spaceborne missions. Further, using the above method, existing spacecraft having a capability for interferometric altimetry may be enabled to perform radio occultation in a simple manner, without requiring any modification of their hardware.

In embodiments, at least one of the first timing and the second timing may be a timing at which the satellite is in occultation by the portion of atmosphere with respect to the receiver. In other words, the satellite may be positioned behind the portion of atmosphere when seen from the receiver at said timing. Since the velocity of the satellite is sufficiently small compared to the speed of signal propagation (i.e., the speed of light), it may be said that at least one of the third and fourth timings may be a timing at which the satellite is in occultation by the portion of atmosphere with respect to the receiver.

In embodiments, the method may further comprise determining a delay value for which a (complex) correlation function of the first signal and the second signal attains its peak value. The method may further comprise determining the first quantity based on the determined delay value.

In embodiments, the method may further comprise determining a second quantity indicative of a Doppler shift resulting from at least one of the first signal and the second signal having passed through the portion of atmosphere between transmission by the satellite and reception at the receiver, based on the determined first quantity.

In embodiments, the method may further comprise determining a third quantity indicative of the excess Doppler shift between the first signal and the second signal based on the determined first quantity and a modelled value of the Doppler shift. The modelled value may be modelled based on information indicative of an ephemeris (i.e., current positions at the first and second timings) of the satellite and receiver. Alternatively, the third quantity may be determined based on the determined second quantity and the modelled value of the Doppler shift.

Having knowledge of the excess Doppler shift enables to calculate the bending angle of a ray path of the incoming signal at an appropriate one of the first and second timings. The bending angle may be inverted into refractivity profiles of the atmosphere against height. These profiles may then be related to atmospheric properties such as atmospheric temperature, pressure and humidity.

In embodiments, both the first timing and the second timing may be timings at which the satellite is in occultation by the portion of atmosphere with respect to the receiver (e.g., both the third timing and the fourth timing may be timings at which the satellite is in occultation by the portion of atmosphere with respect to the receiver). Accordingly, the first and second signals may be obtained with a conveniently brief period of time between the first timing and the second timing, and interferometric radio occultation may be performed in a time-efficient manner.

In embodiments, one of the first timing and the second timing may be a timing at which the satellite is at a substantially zenithal position with respect to the receiver (e.g., one of the third timing and the fourth timing may be a timing at which the satellite is at a substantially zenithal position with respect to the receiver). The other one of the first timing and the second timing may be a timing at which the satellite is in occultation by the portion of atmosphere with respect to the receiver (e.g., the other one of the third timing and the fourth timing may be a timing at which the satellite is in occultation by the portion of atmosphere with respect to the receiver). The zenithal position may be a position at which the angle of inclination of the satellite with respect to the zenith of the location of the receiver is within a given range, such as ±30° (degrees). Accordingly, a very clean reference signal for performing interferometric radio occultation can be obtained, and a signal to noise ratio of the method can be improved.

In embodiments, one of the first timing and the second timing may be a timing at which the satellite is on the point of entering or leaving occultation by the atmosphere with respect to the receiver (e.g., one of the third timing and the fourth timing may be a timing at which the satellite is on the point of entering or leaving occultation by the atmosphere with respect to the receiver). The other one of the first timing and the second timing may be a timing at which the satellite is in occultation by the portion of atmosphere with respect to the receiver (e.g., the other one of the third timing and the fourth timing may be a timing at which the satellite is in occultation by the portion of atmosphere with respect to the receiver). Accordingly, a comparably clean reference signal for performing interferometric radio occultation can be obtained, while interferometric radio occultation may still be performed in a time-efficient manner. Further, only a single antenna for receiving the first and second signals is required at the location of the receiver.

In embodiments, signals transmitted by the satellite may include a specific code having a predetermined repetition period. The specific code may be an acquisition code aiding GNSS receivers in identifying signals from respective satellites. The acquisition code may be a pseudo-random satellite-specific code. The repetition period may be on the order of 1 ms to 4 ms, depending on the GNSS constellation used. In the correlation step, time integration may be performed over an integration length corresponding to an integer multiple of the predetermined repetition period.

In embodiments, the first timing and the second timing may be offset from each other substantially by an integer multiple of the predetermined repetition period. In other words, the second signal may be received later than the first signal (or vice versa) by a time period that is substantially an integer multiple of the predetermined repetition period.

Another aspect of the disclosure relates to a system for performing radio occultation for inferring physical properties of a portion of atmosphere. The system may comprise a receiver for receiving a first signal from a satellite at a first timing and for receiving a second signal from the satellite at a second timing different from the first timing. The first and second signals may be complex-valued signals. The first signal may be used as a reference signal for the second signal, or vice versa. The receiver may be provided aboard a satellite (observation satellite), such as a LEO satellite, for example. The system may further comprise a computation unit. The computation unit may be provided aboard the (observation) satellite carrying the receiver, or at a ground station. The computation unit may receive information indicative of the first and second signals from the receiver. The computation unit may store the first or second signal, used as reference signal. The computation unit may be configured to (complex) correlate the first signal with the second signal. The computation unit may be further configured to determine a first quantity indicative of a path delay between the first signal and the second signal resulting from at least one of the first signal and the second signal having passed through the portion of atmosphere between transmission by the satellite and reception at the receiver, based on a result of the (complex) correlation. Therein, a total path delay between the first and second signals may have a component resulting from different positions of the satellite at respective times of transmission of the first and second signals that are respectively received at the first and second timings, as well as a component resulting from at least one of the first and second signals having passed through the portion of atmosphere.

As indicated above, the satellite position at the time of transmission of the first signal may be different from the satellite position at the time of transmission of the second signal. Thus, when indicating the time of transmission of the first signal as a third timing, and indicating the time of transmission of the second signal as a fourth timing, the third timing may be different from the fourth timing.

In embodiments, at least one of the first timing and the second timing may be a timing at which the satellite is in occultation by the portion of atmosphere with respect to the receiver. In other words, the satellite may be positioned behind the portion of atmosphere when seen from the receiver at said timing. Since the velocity of the satellite is sufficiently small compared to the speed of signal propagation (i.e., the speed of light), it may be said that at least one of the third and fourth timings may be a timing at which the satellite is in occultation by the portion of atmosphere with respect to the receiver.

In embodiments, the computation unit may be further configured to determine a delay value for which a (complex) correlation function of the first signal and the second signal attains its peak value. The computation unit may be yet further configured to determine the first quantity based on the determined delay value.

In embodiments, the computation unit may be further configured to determine a second quantity indicative of a Doppler shift resulting from at least one of the first signal and the second signal having passed through the portion of atmosphere between transmission by the satellite and reception at the receiver, based on the determined first quantity.

In embodiments, the computation unit may be further configured to determine a third quantity indicative of the excess Doppler shift between the first signal and the second signal based on the determined first quantity and a modelled value of the Doppler shift. The modelled value may be modelled based on information indicative of an ephemeris (i.e., current positions at the first and second timings) of the satellite and receiver. Alternatively, the third quantity may be determined based on the determined second quantity and the modelled value of the Doppler shift.

In embodiments, both the first timing and the second timing may be timings at which the satellite is in occultation by the portion of atmosphere with respect to the receiver (e.g., both the third timing and the fourth timing may be timings at which the satellite is in occultation by the portion of atmosphere with respect to the receiver).

In embodiments, one of the first timing and the second timing may be a timing at which the satellite is at a substantially zenithal position with respect to the receiver, and the other one of the first timing and the second timing may be a timing at which the satellite is in occultation by the portion of atmosphere with respect to the receiver (e.g., one of the third timing and the fourth timing may be a timing at which the satellite is at a substantially zenithal position with respect to the receiver, and the other one of the third timing and the fourth timing may be a timing at which the satellite is in occultation by the portion of atmosphere with respect to the receiver). The zenithal position may be a position at which the angle of inclination of the satellite with respect to the zenith of the location of the receiver is within a given range, such as ±30° (degrees).

In embodiments, one of the first timing and the second timing may be a timing at which the satellite is on the point of entering or leaving occultation by the atmosphere with respect to the receiver, and the other one of the first timing and the second timing may be a timing at which the satellite is in occultation by the portion of atmosphere with respect to the receiver (e.g., one of the third timing and the fourth timing may be a timing at which the satellite is on the point of entering or leaving occultation by the atmosphere with respect to the receiver, and the other one of the third timing and the fourth timing may be a timing at which the satellite is in occultation by the portion of atmosphere with respect to the receiver).

In embodiments, signals transmitted by the satellite may include a specific code having a predetermined repetition period. The specific code may be an acquisition code aiding GNSS receivers in identifying signals from respective satellites. The acquisition code may be a pseudo-random satellite-specific code. The repetition period may be on the order of 1 ms to 4 ms, depending on the GNSS constellation used. The computation unit may store the first or second signal, used as reference signal. The computation unit may be further configured to perform time integration in the correlation over an integration length corresponding to an integer multiple of the predetermined repetition period.

In embodiments, the first timing and the second timing may be offset from each other substantially by an integer multiple of the predetermined repetition period. In other words, the second signal may be received later than the first signal (or vice versa) by a time period that is substantially an integer multiple of the predetermined repetition period.

It will be appreciated that method steps and apparatus or system features may be interchanged in many ways. In particular, the details of the disclosed system can be implemented as a method, and vice versa, as the skilled person will appreciate.

BRIEF DESCRIPTION OF THE SEVERAL VIEWS OF THE DRAWINGS

Embodiments of the disclosure are explained below in an exemplary manner with reference to the accompanying drawings, wherein FIG. 1 schematically illustrates the geometry in the context of GNSS radio occultation, FIG. 2 schematically illustrates an example of the interferometric technique for radio occultation according to embodiments of the disclosure, FIG. 3 schematically illustrates signal transmission, propagation and reception, in the context of the interferometric technique for radio occultation according to embodiments of the disclosure, FIG. 4 schematically illustrates an example of power spectral density of noise signals in the context of the interferometric technique for radio occultation according to embodiments of the disclosure, FIG. 6 illustrates conceptual block diagrams of systems for performing radio occultation and for performing an example of the interferometric technique for radio occultation according to embodiments of the disclosure, FIG. 7 schematically illustrates the geometry for a computation of the number of rising and setting events in the context of the interferometric technique for radio occultation according to embodiments of the disclosure, FIG. 8 schematically illustrates the geometry for an example of the of the interferometric technique for radio occultation according to embodiments of the disclosure that is referred to as Zenithal Interferometric Radio Occultation, FIG. 12 is a flowchart schematically illustrating a method of performing an example of the interferometric technique for radio occultation according to embodiments of the disclosure, and FIG. 13 schematically illustrates a system for performing an example of the interferometric technique for radio occultation according to embodiments of the disclosure.

DETAILED DESCRIPTION

Figure 1:
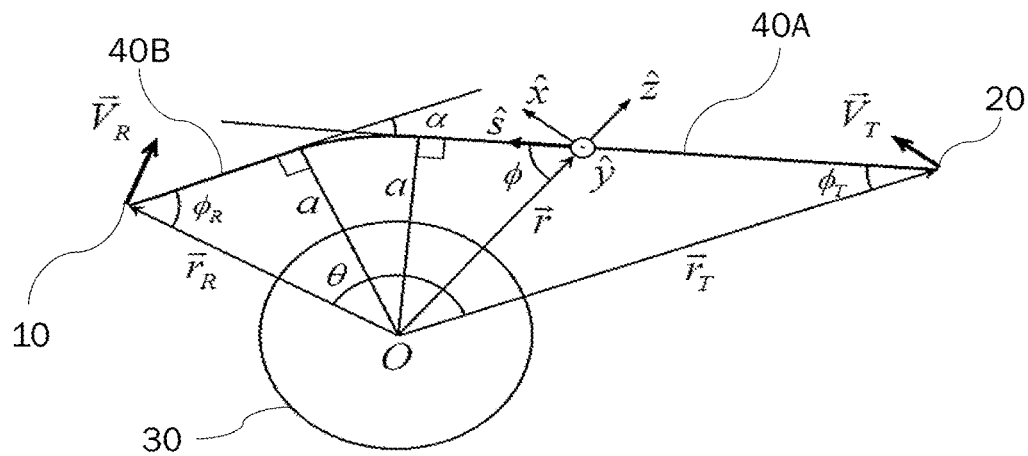

In the following, the invention will be described in an exemplary manner with reference to the appended figures. Identical elements in the figures may be indicated by identical reference numbers, and repeated description thereof may be omitted.

Broadly speaking, the present disclosure presents a new way of performing radio occultation with GNSS signals (navigation signals) using an interferometric technique. Two possibilities are proposed. The first one involves performing the (complex) auto-correlation function of the received signal transmitted by a rising or setting GNSS satellite. The auto-correlation function may be evaluated around time epochs that are multiples of a period of suitable codes found in the modulation of the GNSS signals. Satellite discrimination may be performed spatially, through the antenna pattern. The second possibility involves acquiring a reference signal separately from the occultation event, which, in turn, has two options: zenithal and top of the atmosphere acquisition. This new approach to radio occultation may be employed e.g., as a convenient add-on to an altimetric instrument based on interferometric GNSS reflectometry, which is found to typically include an antenna of the required characteristics.

GNSS-RO is a technique that may be used in operational meteorology. In very simple terms, the GNSS-RO technique involves cross-correlating an incoming signal transmitted by a rising/setting GNSS satellite with a locally-generated clean replica of a suitable open-access code (e.g., an acquisition code) to determine the accumulated phase of the incoming signal over time, from which the excess Doppler frequency due to the bending of the ray path through the atmosphere can be extracted and finally inverted into refractivity profiles against height. These profiles may then be related to atmospheric properties such as atmospheric temperature, pressure and humidity, for example.

First, a more detailed description of a technique that may be used in the context of GNSS-RO will be provided.

Radio occultation observations may be performed by measuring the accumulated phase (also referred to as integrated Doppler count) of the signal of a GNSS satellite setting behind or rising from the Earth (i.e., entering of leaving occultation by the Earth). The accumulated phase may be obtained from the cross-correlation $z(t)$ of the incoming signal $y(t)$ and a clean replica of one suitable component $x(t)$ of the same navigation signal, over an integration period $T_o$, via $$z(\tau) = \frac{1}{T_o} \int_{-T_o/2}^{T_o/2} y(t) x^*(t-\tau) dt \qquad [1]$$

The incoming signal is, in general, a combination of complex signals modulated by pseudorandom (PRN) binary ranging codes, in most cases multiplied also by data streams. All PRN ranging codes of all existing GNSS systems are periodic, but some of the periods are far longer than the duration of an occultation (typically a few minutes) and can be considered aperiodic for the present purpose. On the other hand, there always exists a code, which will be referred to as acquisition code in the present disclosure, whose purpose is to allow navigation receivers (GNSS receivers) to find and lock quickly onto the GNSS signals. The acquisition code has a repetition period in the order of one or some milliseconds (e.g., 1 ms or 4 ms), i.e., much shorter than an occultation event. The acquisition codes reduce the duration of delays during which a navigation receiver has to search for the signal of a particular GNSS satellite, at the expense of introducing a delay ambiguity equal to an integer multiple of their period. With these considerations, the incoming signal can be expressed as a combination of several signal components $$y(t) = y_T(t) + \sum_i y_i(t) \qquad [2]$$

where $y_T(t)$ represents, explicitly, the component modulated with the acquisition code of short period $T$, and $y_i(t)$ represents any other i-th component, effectively aperiodic over the duration of an occultation.

The signal $x(t)$ that the receiver uses to extract the Doppler count through the correlation process in Equation [1] is precisely a replica of the signal component $y_T(t)$ modulated by the acquisition code. Renaming the replica by $x_T(t)$, and taking into account that the different components of the navigation signals are orthogonal to each other, Equation [1] can be rewritten as $$z(\tau) = \frac{1}{T_o} \int_{-T_o/2}^{T_o/2} y_T(t) x_T^*(t-\tau) dt \qquad [3]$$

Without loss of generality and obviating amplitude factors of no impact on the final result of the present analysis, the received signal component $y_T(t)$ can be expressed as a delayed version of the replica $x_T(t)$, namely $$y_T(t) = x_T(-u) \qquad [4]$$

where $u=u(t)$ is the propagation delay along the ray path from the position the transmitting GNSS satellite, to that of the receiving satellite, typically in Low Earth Orbit (LEO), traversing the medium in between the two. An example of the geometry between the transmitting GNSS satellite and the receiving satellite is schematically illustrated in FIG. 1, in which reference number 10 indicates the receiver (e.g., a LEO satellite), 20 indicates the transmitter (e.g., a GNSS satellite), 30 indicates Earth, and 40A, 40B indicate the ray path of a signal transmitted by the transmitter 20 and received by the receiver 10. The propagation delay is given by the line integral $$u(t) = \frac{1}{c} \int_{\vec{r}_T(t-u)}^{\vec{r}_R(t)} n(\vec{r}) ds \qquad [5]$$

with c being the speed of light in vacuum.

Choosing the integration period in Equation [3] as a suitable integer number p of the repetition period of the acquisition code, $T_o = pT$, and plugging Equation [4] into Equation [3] yields $$z(\tau) = \frac{1}{pT} \int_{-pT/2}^{pT/2} x_T(t-u) x_T^*(t-\tau) dt \qquad [6]$$

In open loop (a similar reasoning could be applied to close loop operation), the receiver estimates the transit time of the received signal, modulo the period of the acquisition code, with a modelled value $\tau_g$, which deviates from the true delay u by some amount $\Delta\tau$, so that $$\tau_g mT = u + \Delta\tau \qquad [7]$$

where the integer number of code periods represents the code ambiguity. The peak of the correlation in Equation [6] occurs at a delay $\tau_p$ equal to u, modulo the code ambiguity, $$\tau_p = u - mT = \tau_g - \Delta\tau \qquad [8]$$

and the deviation of the modelled value from the observed position of the peak gives the excess code delay $\Delta\tau$, $$\Delta\tau = \tau_g - \tau_p \quad [9]$$

and the excess phase delay at the nominal frequency f, denoted by $\Delta\varphi$, $$\Delta\varphi = 2\pi f \Delta\tau \quad [10]$$

The excess phase delay $\Delta\varphi$ is measured for every pT interval, so that the excess Doppler frequency can be estimated by differentiating consecutive observations (readings), via $$\Delta f(t) \frac{\Delta\varphi(t + pT) - \Delta\varphi(t)}{2\pi pT} \quad [11]$$

The sampling interval pT may be chosen short enough to ensure that any phase wrapping in the numerator of Equation [11] can be tracked. Plugging Equations [7] and [10] into Equation [11] yields $$\frac{\Delta f(t)}{f} = \frac{\tau_g(t + pT) - \tau_g(t)}{pT} - \frac{u(t + pT) - u(t)}{pT} \quad [12]$$

From the observed excess Doppler frequency and the modelled delays, the total Doppler shift may be derived via $$f_D = f_g + \Delta f \quad [13]$$

with $$f_D = -f \frac{u(t + pT) - u(t)}{pT} \quad [14]$$

$$f_g = -f \frac{\tau_g(t + pT) - \tau_g(t)}{pT}$$

The Doppler shift is related to the bending angle of the ray path of the signal through the atmosphere. The geometry of the ray path assuming a spherically symmetric atmosphere, i.e., one in which the refraction index only depends on the distance to the radius of curvature O, n=n(r) is shown in FIG. 1. Defining the unit vector in the direction of the ray as $$\hat{s} = (\sin\varphi, 0, -\cos\varphi) \quad [15]$$

the Doppler frequency can be expressed as $$\frac{f_D}{f} = \frac{1}{c}(\vec{V}_T \cdot \hat{s}_T - \vec{V}_R \cdot \hat{s}_R) \quad [16]$$

$$= \frac{1}{c}(V_{Tx}\sin\phi_T - V_{Tz}\cos\phi_T - V_{Rx}\sin\phi_R - V_{Rz}\cos\phi_R)$$

where ($V_{Tx}$, $V_{Ty}$, $V_{Tz}$) and ($V_{Rx}$, $V_{Ry}$, $V_{Rz}$) indicate the velocities (velocity vectors) of the transmitter and the receiver, respectively.

In Equation [16], the left hand side stems from the measurements of the receiver given by Equation [13], and the velocities of the transmitter and receiver in the right hand side are obtained from navigation information (e.g., from ephemerides of respective satellites). Thus, only the ray path angles $\varphi_T$ and $\varphi_R$ remain as unknowns. These angles can be determined by using Equation [16] together with Bouguer's rule, or Snell's law in a spherically symmetric medium, namely $$r_T \sin\varphi_T = r_R \sin\varphi_R = a \quad [17]$$

where a is known as the impact parameter. The parameters of Equation [17] are illustrated e.g., in FIG. 1.

Once the ray path angles have been determined, and using the angle $\theta$ (which is the polar angle between the transmitter and the receiver) derived from the geometry and navigation data, the bending angle $\alpha$ can be finally obtained as $$\alpha = \theta + \varphi_T + \varphi_R - \pi \quad [18]$$

The bending angle $\alpha$ may be measured at two frequencies to remove the effect of the ionosphere, and combining the measured values of $\alpha$ at the two frequencies adequately yields the bending due to the neutral atmosphere. The recorded bending angles as a function of the impact parameter may be inverted, using the Abel transform, into the radial variation of the index of refraction in the atmosphere.

Next, an example of the interferometric technique (method) for radio occultation according to embodiments of the disclosure will be described.

In contrast to the technique described above, the present disclosure proposes a new method for radio occultation, which uses a received signal as reference in the cross-correlation process that leads to the phase observables. Since this translates into performing the complex auto-correlation of the received signal, the new technique shall be referred to as interferometric radio occultation throughout the present disclosure.

The basic observable in radio occultation is the Doppler frequency of the received signal. Employing the method according to embodiments of the invention, it is possible to derive precisely the Doppler shift of the signal transmitted by a rising or setting GNSS satellite, and thus, perform radio occultation, e.g., using a variation of the Passive Reflectometry and Interferometry System (PARIS) interferometric technique used in GNSS reflectometry.

In GNSS interferometric reflectometry, the received direct signal, instead of a locally generated clean replica of a code, is used, properly aligned in time, as reference for the correlation with the reflected signal. By applying these principles to radio occultation, the direct signal itself is presently proposed to be used as reference signal into the correlation process that provides the radio occultation observables.

FIG. 12 is a flowchart illustrating steps of the method for interferometric radio occultation. Using this method, physical properties (e.g., atmospheric properties such as atmospheric temperature, pressure and humidity) of a portion of atmosphere can be inferred.

Of steps S1201 through 1204 illustrated in FIG. 12, all steps may be performed at a satellite (observation satellite, e.g., a LEO satellite) carrying a receiver for receiving signals from another satellite (e.g., a GNSS satellite). Alternatively, only steps S1201 and S1202 may be performed at the observation satellite, and steps S1203 and S1204, and any further steps may be performed on ground (e.g., at a ground station that communicates with the observation satellite).

At step S1201, a first signal from a satellite (e.g., a GNSS satellite) is received at a receiver. The first signal is received at a first timing. The first signal may be a complex-valued signal. The receiver may be arranged aboard a satellite (observation satellite, e.g., a LEO satellite), or at a ground station.

At step S1202, a second signal from the same satellite is received at the receiver. The second signal is received at a second timing. The second timing may be later than the first timing. The second signal may be a complex-valued signal. The first signal may be used as a reference signal for the second signal, or vice versa. Notably, at least one of the first timing and the second timing may be a timing at which the satellite is in occultation by the portion of atmosphere with respect to the receiver. Therein, the satellite is considered to be in occultation by a portion of atmosphere with respect to the receiver if the satellite is behind said portion of the atmosphere when seen from the receiver.

For instance, in one embodiment both the first timing and the second timing may be timings at which the satellite is in occultation by the portion of atmosphere with respect to the receiver, i.e., a signal transmitted by the satellite and received by the receiver needs to pass through the atmosphere at both timings. The interferometric radio occultation technique for this particular case will be referred to as pure interferometric radio occultation throughout the present disclosure.

If steps S1201 and S1202 are performed at a first location that is different from a second location at which the subsequent steps are performed, the method may further comprise a step of communicating information indicative of the first and second signals to the second location. As indicated above, one of the first signal and the second signal may be used as reference signal for the other one of the first signal and the second signal. The method may further comprise a step of storing said one of the first signal and the second signal.

At step S1203, the first signal is correlated with the second signal. This may involve complex-correlating the first signal with the second signal.

Implementing steps S1201 to S1203, the clean replica $x(t)$ in Equation [1] has to be replaced by the received direct signal $y(t)$, $$z(\tau) = \frac{1}{T_o} \int_{-T_o/2}^{T_o/2} y(t) y^*(t-\tau) dt \qquad [19]$$

which is equivalent to performing the (complex) auto-correlation function of the received signal. Using Equation [2] and the orthogonality property between signal components yields $$z(\tau) = \frac{1}{T_o} \int_{-T_o/2}^{T_o/2} \left( y(t) y_T^*(t-\tau) + \sum_i y_i(t) y_i^*(t-\tau) dt \right) \qquad [20]$$

The auto-correlation function may now be evaluated at epoch times around a multiple n>0 of the period (repetition period) T of the acquisition code, T. An integer multiple of the repetition period, pT, may be used as integration time (integration length), which yields $$z(nT+\tau) = \frac{1}{pT} \int_{-pT/2}^{pT/2} y_T(t) y_T^*(t-nT-\tau) dt \qquad [21]$$

where the auto-correlation function of the effectively aperiodic components, including both open as well as restricted access signals, has vanished. The acquisition code exemplarily embodies a specific code having a predetermined repetition period. As indicated above, the specific code may be an acquisition code aiding GNSS receivers in identifying signals from respective satellites. The acquisition code may be a pseudo-random satellite-specific code. The repetition period may be on the order of 1 ms to 4 ms, depending on the GNSS constellation used.

Letting $x_T(t)$ represent the signal transmitted by the GNSS satellite at time t, the corresponding received signal has the same form as in Equations [4] and [5], and Equation [21] becomes $$z(nT+\tau) = \frac{1}{pT} \int_{-pT/2}^{pT/2} x_T(t-u_o) x_T^*(t-nT-\tau-u_n) dt \qquad [22]$$

where $u_o$ and $u_n$ are the path delays at receiving times t and t−nT respectively, that is, $$u_o = u(t) = \frac{1}{c} \int_{\vec{r}_T(t-u_o)}^{\vec{r}_R(t)} n(\vec{r}) ds \qquad [23]$$

$$u_n = u(t-nT) = \frac{1}{c} \int_{\vec{r}_T(t-nT-u_n)}^{\vec{r}_R(t-nT)} n(\vec{r}) ds$$

The first function inside the integral in Equation [22] represents the signal received at time epoch t (i.e., the second signal received at the second timing), which was transmitted at $t-u_o$ and travelled along the ray path $S_o$, of electrical length $u_o$. Similarly, the second term is the signal that was transmitted at $t-nT-u_n$ (i.e., the first signal received at the first timing), being received at t−nT (i.e., at the first timing) after having followed a different ray path $S_n$, of electrical length $u_n$. The integration length of the correlation corresponds to an integer multiple of the repetition period, as mentioned above. The first and second signals may have a length in time (sample length, duration) that is equal to or greater than the integration length $T_0$. The first and second timings may be offset from each other by nT, i.e., by an integer multiple of the repetition period T.

Figure 2:
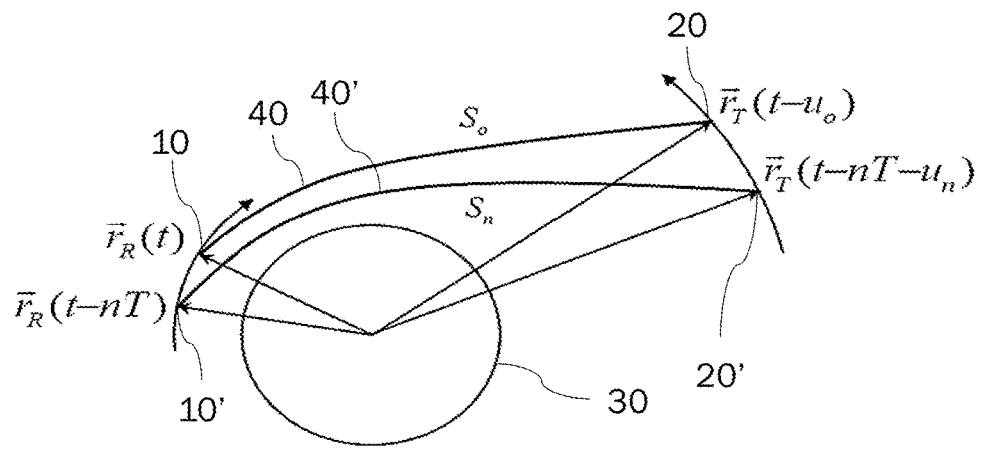

Therefore, Equation [22] represents the coherence function of the field, evaluated at two different time epochs and points in space, involving two different rays across the atmosphere. This situation is illustrated in FIG. 2, in which reference numbers 10, 10' indicate the receiver at the two different time epochs, 20, 20' indicate the transmitter at the two different time epochs, 40, 40' indicate the ray paths corresponding to the two different time epochs, and 30 indicates Earth.

At step S1204, a first quantity indicative of a path delay between the first signal and the second signal resulting from at least one of the first signal and the second signal having passed through the portion of atmosphere between transmission by the satellite and reception at the receiver is determined. This determination may be based on a result of the correlation performed at step S1203, such as a correlation function obtained at this step, e.g., the correlation function of Equation [22]. A total path delay between the first and second signals may have a component resulting from different positions of the satellite at the first and second timings, as well as a component resulting from at least one of the first and second signals having passed through the portion of atmosphere.

As it was done in Equation [7], a model value $\Delta\tau_g$ (corresponding to a modelled value of the Doppler shift or the Doppler delay) can be used to time-align the two components inside the integral in Equation [22], except for the integer number of codes, nT, and a residual error $\Delta\tau$, such that $$\Delta\tau_g + u_n = u_o + \Delta\tau \qquad [24]$$

The model $\Delta\tau_g$ may be an estimation of the differential delay between paths $S_o$ and $S_n$, i.e.

$$\Delta\tau_g = \tau_g(t) - \tau_g(t-nT) \quad [25]$$

The modelled value $\Delta\tau_g$ may be modelled based on information indicative of an ephemeris (i.e., current positions at the first and second timings) of the satellite. The peak of the autocorrelation Equation [22] occurs at a delay value $ti_p$ for which the time alignment between the signals is perfect, that is, when $$\pi_p = u_o - u_n = \Delta\tau_g - \Delta\tau \quad [26]$$

Thus, step S1204 may involve determining a delay value $\tau_p$ for which the (complex) correlation function of the first signal and the second signal attains its peak value. The path delay $u_o-u_n$ is an example of the first quantity determined at step S1204. In general, the first quantity may depend on, e.g., be proportional to, the path delay. The first quantity may be determined based on the delay value $\tau_p$, as can be seen e.g., from Equation [26].

The deviation of the modelled value $\Delta\tau_g$ from the observed position $\tau_p$ of the peak gives the excess code delay $\Delta\tau$, $$\Delta\tau = \Delta\tau_g - \tau_p \quad [27]$$

and the excess phase delay $\Delta\varphi$ at the nominal frequency $f$ $$\Delta\varphi = 2\pi f \Delta\tau \quad [28]$$

This excess phase delay (and likewise the excess code delay) has been accumulated over a time interval nT, so that the excess Doppler frequency can be estimated by $$\Delta f(t) \frac{\Delta\varphi(t)}{2\pi nT} \quad [29]$$

Plugging Equations [24], [25], and [28] into Equation [29] yields $$\frac{\Delta f(t)}{f} = \frac{\tau_g(t) - \tau_g(t-nT)}{nT} - \frac{u(t) - u(t-nT)}{nT} \quad [30]$$

In Equation [30], the rightmost term $(u(t)-(u(t-nT))/nT$ is an example of a second quantity indicative of a Doppler shift resulting from at least one of the first signal and the second signal having passed through the portion of the atmosphere between transmission by the satellite and reception at the receiver. The second quantity may be determined based on the first quantity, e.g., by dividing the first quantity by the offset nT (central delay) between the first timing and the second timing. Further, the (normalized) excess Doppler frequency $\Delta f(t)/f$ is an example of a third quantity indicative of the excess Doppler shift between the first signal and the second signal. The third quantity may be determined based on the modelled value of the Doppler shift or the Doppler delay and the first quantity (or the modelled value of the Doppler shift or the Doppler delay, and the second quantity), e.g., according to Equation [30].

From the observed excess Doppler frequency and the modelled delay, the total Doppler shift $f_D$ can be derived via $$f_D = f_g + \Delta f \quad [31]$$

with $$f_D = -f\frac{u(t) - u(t-nT)}{nT} \quad [32]$$

$$f_g = -f\frac{\tau_g(t) - \tau_g(t-nT)}{nT}$$

In order to provide the same Doppler shift observable with the interferometric technique in Equation [32] as with the approach of Equation [14], the integration time (integration length) of the auto-correlation function, pT, may be chosen equal to the central delay nT, that is, $$T_o = pT = nT \quad [33]$$

Accordingly, the interferometric radio occultation technique according to embodiments of the present disclosure described above can provide observations of the Doppler shift of the received signal from a rising or setting satellite (e.g., GNSS satellite), and can therefore be used to perform radio occultation. The bending angle $\alpha$ may then be determined in accordance with Equations [15] through [18], i.e., the bending angle $\alpha$ may be determined based on the first quantity or the second quantity, or based on the third quantity and the modelled value of the Doppler shift or Doppler delay. Thus, the method may further comprise a step of determining the bending angle based on any one of the first quantity, the second quantity, or the third quantity. Correspondingly, the method may further comprise a step of determining physical properties of the portion of atmosphere based on any one of the first quantity, the second quantity, or the third quantity.

Notably, a system for performing radio occultation according to the interferometric radio occultation technique may comprise a receiver configured to perform the processing of steps S1201 and S1202 described above, and a computation unit configured to perform the processing of steps S1203 and S1204 described above, and any subsequent steps. Such system is illustrated in FIG. 13, in which reference number 1310 indicates a receiver for receiving the first and second signals, and 1320 indicates the computation unit. The receiver 1310 may be connected to an antenna. The receiver 1310 and the computation unit 1320 may be provided at different locations, e.g., aboard a satellite (e.g., LEO satellite) and on ground (e.g., in a ground station), and may communicate with each other, such that the computation unit may receive information indicative of the first and second signals from the receiver.

Next, a couple of remarks relating to the interferometric radio occultation technique according to embodiments of the disclosure when compared to the technique of Equations [1] through [14] are provided.

There is a choice in the number of acquisition periods n to take for the central delay, nT, of the auto-correlation function of the incoming signal (i.e., for the offset between the first and second signals). The description above has assumed an undefined integer number n>0, which, to replicate the technique of Equations [1] through [14], should be equal to the number of periods of the integration time (integration length) of the correlation, i.e., n=p. The higher n is, the wider apart the path rays $S_o$ and $S_n$ followed by the two signal portions involved in the auto-correlation will be. The closest ray path spacing corresponds to n=1.

The complex value of the auto-correlation function at delays around the central delay, i.e., at nT+$\tau$, is likely to carry valuable geophysical information of the structure of the atmosphere around the propagation path $S_n$. In the particular case of n=0, all codes of the navigation signals, not only coarse acquisition code, do contribute to the auto-correlation function, which becomes higher in amplitude and narrower in width. The sampling of the structure of the atmosphere may be enhanced by this fact when n=0 is chosen for the central delay.

In the radio occultation technique of Equations [1] through [14], the delay model has to estimate the delay along a single ray path from the transmitter to the receiver. In interferometric radio occultation, the model has to estimate the difference in delay between two ray paths temporarily spaced according to the auto-correlation function (i.e., spaced in accordance with the first timing and the second timing).

Since the temporal separation of the two ray paths followed by the signal being auto-correlated is of the order of milliseconds (same order of magnitude as the acquisition code period T), the differential excess path will be of the order of the wavelength. Hence, there is no need to include an integer ambiguity of code periods in the model Equation [24] of the differential path delay.

In the above, the effect of the navigation bit has not been discussed. Because it is unknown, it may lead to 180 degree phase jumps in the phase of the interferometric complex auto-correlation. Therefore, a phase unwrapping step may be provided, e.g., on ground.

In interferometric radio occultation, the discrimination across GNSS satellites cannot be done by code division, since no clean code replica is used. The selection of GNSS satellites may be performed through the antenna pattern. Therefore, interferometric radio occultation works best with high gain steerable receiving antennas. This subject is discussed in more detail below. Discrimination of satellites belonging to different systems (constellations) might be partly facilitated when the period of the acquisition codes of the GNSS systems are different from each other.

The signal to noise ratio (SNR) has to be evaluated for interferometric radio occultation technique as the received signal itself, embedded in noise, is used as reference signal instead of a clean code replica. This is discussed in more detail below.

Next, an analysis of the SNR in interferometric radio occultation and respective results will be described.

Figure 3:
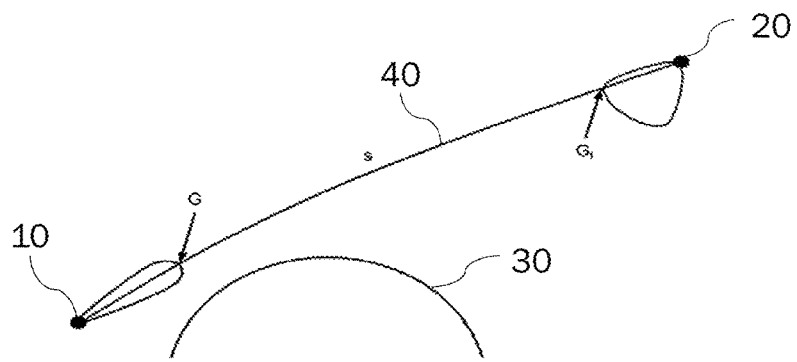
Figure 4:
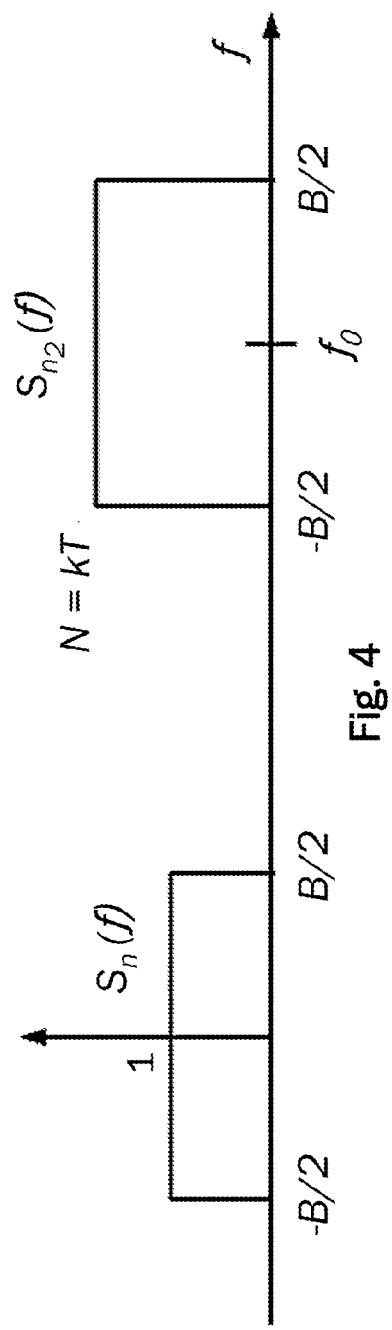

Any transmitted GNSS signal $x_t$ can be expressed, in its analytical general form, as $$x_t(t) = \sqrt{2P}x(t)e^{j2\pi f_o t} \quad [34]$$

where the complex modulation signal x, of unity power, results from the composition of various pseudorandom ranging codes and navigation data streams, P represents the power of the signal and $f_o = c/\lambda_o$ is the apparent frequency of transmission. The received signal y is a delayed and amplitude-reduced version of the transmitted signal $x_t$, due to the path travelled through space and Earth's atmosphere, of length $s(t) = cu(t)$, $$y(t) = \frac{\lambda_o \sqrt{G_t G}}{4\pi s(t)} x_t(t - u(t)) \quad [35]$$

where $G_t$ is the gain of the GNSS satellite in the direction of the receiver, and G is the gain of the beam the latter has steered in the direction of the former, as illustrated in FIG. 3, which schematically illustrates signal transmission, propagation and reception, in the context of interferometric radio occultation. Reference number 10 indicates the receiver (e.g., LEO receiver) at time t, and 20 indicates the transmitter (e.g., GNSS transmitter) at time t−u. The input signal to the receiver is a combination of Equation [35] and the system noise at the antenna plane, described by $$n_a(t) = \sqrt{2N}n(t)e^{j2\pi f_o t} \quad [36]$$

where $N = kT_{sys}$ is the power spectral density (k being the Boltzmann constant and $T_{sys}$ the equivalent system noise temperature), and n(t) is a circular complex Gaussian random process of unity power spectral density, band-limited by the receiver bandwidth, as illustrated in FIG. 4, which is a schematic illustration of an example of power spectral density of noise signals in the context of the interferometric radio occultation.

Figure 5:
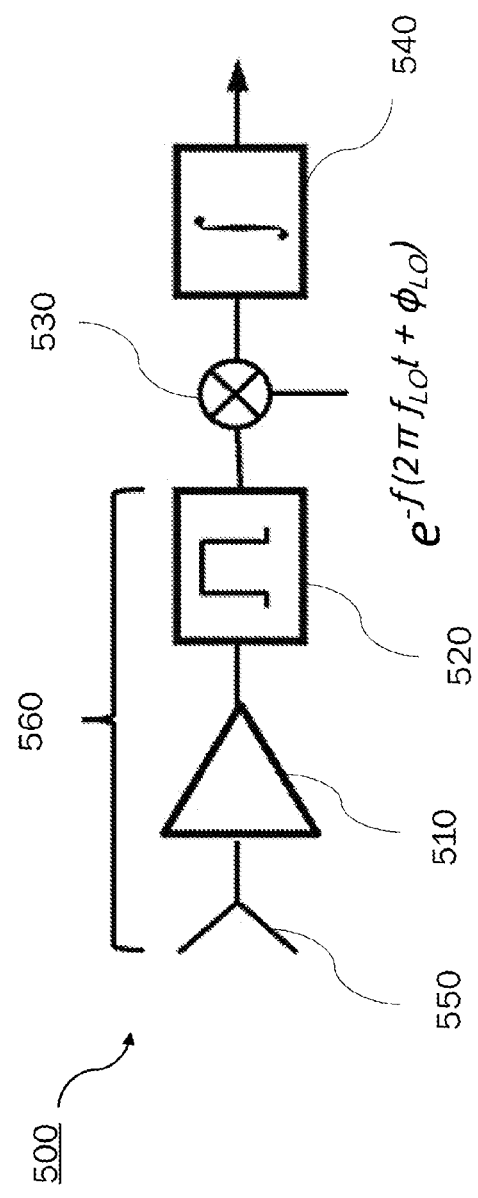
FIG. 5 illustrates a conceptual block diagram of a system for performing an example of the interferometric technique for radio occultation according to embodiments of the disclosure.

FIG. 5 shows a conceptual block diagram of an interferometric instrument (system) 500 for radio occultation. The receiver input signal is amplified by an amplifier 510 (for simplicity the gain will be considered unity), band-pass filtered by a bandpass filter 520 with bandwidth B, down-converted with a multiplier 530 connected to a local oscillator of frequency $f_{LO}$ and phase $\varphi_{LO}$, and finally auto-correlated by a correlator (auto-correlator) 540. The amplifier 510, the bandpass filter 520 and an antenna 550 for receiving the signal may be comprised by a beamformer 560. The correlator 540 may be comprised by or implemented by a computation unit.

The auto-correlator input $y_c$ is given by $$y_c(t) = (y(t) + n_a(t))e^{-j(2\pi f_{LO} t + \varphi_{LO})} \quad [37]$$

and plugging Equations [34] through [36] into Equation [37] yields $$y_c(t) = e^{-j\varphi_{LO}} e^{j2\pi(f_o - f_{LO})t} \times \quad [38]$$
$$\left( \frac{\lambda_o \sqrt{G_t G}}{4\pi s(t)} \sqrt{2P}\, x(t - u(t))e^{-j2\pi f_o u} + \sqrt{2N}\, n(t) \right)$$

Following Equation [21], the auto-correlator output z is given by $$z(nT + \tau) = \frac{1}{pT}\int_{-pT/2}^{pT/2} y_c(t)y_c^*(t - nT - \tau)\,dt \quad [39]$$

When Equation [38] is plugged into Equation [39], four signal-noise combination terms are obtained, $$z(\alpha) = z_{xx}(\alpha) + z_{xn}(\alpha) + z_{nx}(\alpha) + z_{nn}(\alpha) \quad [40]$$

where $$z_{xx}(nT + \tau) = \quad [41]$$
$$e^{j2\pi(f_o - f_{LO})(nT+\tau)} \times \left(\frac{\lambda_o}{4\pi}\right)^2 \frac{G_t G}{s_o s_n} 2P e^{j2\pi f_o(u_n - u_o)} R_x(nT + \tau + u_n - u_o)$$

$$z_{xn}(nT + \tau) = \quad [42]$$
$$e^{j2\pi(f_o - f_{LO})(nT+\tau)} \times \frac{\lambda_o}{4\pi} \frac{\sqrt{G_t G}}{s_o} 2\sqrt{PN}\, e^{-j2\pi f_o u_o} R_{xn}(nT + \tau - u_o)$$

$$z_{nx}(nT + \tau) = \quad [43]$$
$$e^{j2\pi(f_o - f_{LO})(nT+\tau)} \times \frac{\lambda_o}{4\pi} \frac{\sqrt{G_t G}}{s_n} 2\sqrt{PN}\, e^{j2\pi f_o u_n} R_{nx}(nT + \tau + u_n)$$

$$z_{nn}(nT + \tau) = e^{j2\pi(f_o - f_{LO})(nT+\tau)} \times 2N R_{nn}(nT + \tau) \quad [44]$$

and $R_{ab}$ is a cross-correlation function, which is in general, defined as $$R_{ab}(\alpha) \equiv \frac{1}{pT}\int_{-pT/2}^{pT/2} a(t)b^*(t-\alpha)dt \quad [45]$$

Since the system noise is a random process, the average power at the output of the correlator will be computed. Assuming that the auto-correlation of the system noise is very narrow in time, it follows from Equation [40] that $$\langle |z(\alpha)|\rangle = |z_{xx}(\alpha)|^2 + \langle |z_{xn}(\alpha)|^2\rangle + \langle z_{nx}(\alpha)|^2 + \rangle z_{nn}(\alpha)$$
$$|^2\langle z_{nn}(\alpha)|^2\rangle \quad [46]$$

The four terms in the right hand side of Equation [46] may now be evaluated for a delay that perfectly balances the differential path delay. That is, using $\tau = \tau i_p$ in Equation [26], this yields:

Signal term $|z_{xx}(\alpha)|^2$, $$|z_{xx}(nT+\tau_p)|^2 = \left(\frac{\lambda_o}{4\pi}\right)^4 \left(\frac{G_t G}{s_o s_n}\right)^2 4P^2|R_x(nT)|^2 \quad [47]$$

The auto-correlation function $R_x$ at $nT$ is zero for all navigation signals except for the coarse acquisition component $x_T$, for which it takes an amplitude of one for any delay multiple of T. If A is the power of the coarse acquisition component, one obtains $$|R_x(nT)|^2 = A^2|R_{x_T}(nT)|^2 = A^2 \quad [48]$$

Hence $$|z_{xx}(nT+\tau_p)|^2 = \left(\frac{\lambda_o}{4\pi}\right)^4 \left(\frac{G_t G}{s_o s_n}\right)^2 4P^2 A^2 \quad [49]$$

It is noted that since the composite navigation signal x was assumed to have unity power in Equation [34], one necessarily has A<1.

Signal times noise term $|z_{xn}(\alpha)|^2$, $$\langle |z_{xn}(nT+\tau_p)|^2\rangle = \left(\frac{\lambda_o}{4\pi}\right)^2 \frac{G_t G}{s_o^2} 4PN\langle |R_{xn}(nT-u_n)|^2\rangle \quad [50]$$

with $$\langle |R_{xn}(nT-u_n)|^2\rangle = \quad [51]$$
$$\left(\frac{1}{pT}\right)^2 \int_{-pT/2}^{pT/2}\int_{-pT/2}^{pT/2} x(t)x^*(t')\langle n^*(t-nT+u_n)n(t'-nT+u_n)\rangle dt dt'$$

The second order moment inside the integral is the auto-correlation of the noise, $\Gamma_n$, $$\langle n^*(t-nT+u_n)n(t'-nT+u_n)\rangle = \Gamma_n(t'-t) \quad [52]$$

which, by the Wiener-Khintchine theorem, equals the inverse Fourier Transform of the power spectral density of the noise n, depicted in FIG. 4, that is $$\Gamma_n(\tau) = B\, \text{sin } c\, B\tau \quad [53]$$

Therefore, $$\langle |R_{xn}(nT-u_n)|^2\rangle = \left(\frac{1}{pT}\right)^2 \int_{-pT/2}^{pT/2}\int_{-pT/2}^{pT/2} x(t)x^*(t')B\text{sinc}(B(t'-t))dt dt' \quad [54]$$

Taking into account that the width of the sin c function (i.e., 2/B between its first zeroes) is much narrower than the integration time pT yields $$\int_{-pT/2}^{pT/2} B\text{sinc}(B\tau)d\tau = \int_{-\infty}^{+\infty} B\text{sinc}(B\tau)d\tau = 1 \quad [55]$$

and $$\langle |R_{xn}(nT-u_n)|^2\rangle = \frac{1}{pT} \quad [56]$$

$$\langle |z_{xn}(nT+\tau_p)|^2\rangle = \left(\frac{\lambda_o}{4\pi}\right)^4 \frac{G_t G}{s_o^2} 4PN\frac{1}{pT} \quad [57]$$

Noise times signal term $|z_{nx}(\alpha)|^2$, $$\langle |z_{xn}(nT+\tau_p)|^2\rangle = \left(\frac{\lambda_o}{4\pi}\right)^4 \frac{G_t G}{s_n^2} 4PN\langle |R_{nx}(nT+u_o)|^2\rangle \quad [58]$$

with $$\langle |R_{nx}(nT+u_o)|^2\rangle = \quad [59]$$
$$\left(\frac{1}{pT}\right)^2 \int_{-pT/2}^{pT/2}\int_{-pT/2}^{pT/2} \langle n(t)n^*(t')\rangle x^*(t-nT-u_o)x(t'-nT-u_o)dt dt'$$

Applying Equations [52] and [53] yields $$\langle |R_{nx}(nT+u_o)|^2\rangle = \frac{1}{pT} \quad [60]$$

$$\langle |z_{nx}(nT+\tau_p)|^2\rangle = \left(\frac{\lambda_o}{4\pi}\right)^2 \frac{G_t G}{s_n^2} 4PN\frac{1}{pT} \quad [61]$$

Noise term $|z_{nn}(\alpha)|^2$, $$\langle |z_{nn}(nT+\tau_p)|^2\rangle = 4N^2\langle |R_{nn}(nT+\tau_p)|^2\rangle \quad [62]$$

$$\langle |R_{nn}(nT+\tau_p)|^2\rangle = \quad [63]$$
$$\left(\frac{1}{pT}\right)^2 \int_{-pT/2}^{pT/2}\int_{-pT/2}^{pT/2} \langle n(t)n^*(t')\rangle n^*(t-nT-\tau_p)n(t'-nT-\tau_p)dt dt'$$

The fourth order moment inside the integral can be decomposed, making use of the complex Gaussian moment theorem discussed e.g., in Goodman J. W, Statistical Optics, John Wiley and Sons, 1985, New York, into $$\langle n(t)n^*(t')n^*(t-nT-\tau_p)n(t'-nT-\tau_p)\rangle = \langle n(t)n^*(t-nT-\tau_p)n^*(t')n(t'-nT-\tau_p)\rangle = \langle n(t)n^*(t')\rangle\langle n^*(t-nT-\tau_p)n(t'-nT-\tau_p)\rangle + \langle n(t)n(t'-nT-\tau_p)\rangle\langle n^*(-nT-\tau_p)n^*(t')\rangle \quad [64]$$

The last two second order moments are zero when n>0 in nT, while the pair before the squared auto-correlation of the noise is given by $$\langle n(t)n^*(t-nT-\tau p)n^*(t'-nT-\tau_p)\rangle = |\Gamma_n(t-t')|^2 \quad [65]$$

Therefore $$\langle |R_{nn}(nT+\tau_p)|^2\rangle = \left(\frac{1}{pT}\right)^2 \int_{-pT/2}^{pT/2}\int_{-pT/2}^{pT/2} B^2\text{sinc}^2(B(t-t'))dt dt' \quad [66]$$

which further yields $$\langle |R_{nn}(nT+\tau_p)|^2\rangle = \frac{B}{pT} \qquad [67]$$

$$\langle |z_{nn}(nT+\tau_p)|^2\rangle = 4N^2\frac{B}{pT} \qquad [68]$$

Using the above results, the SNR can now be computed via $$SNR \equiv \frac{|z_{xx}(\alpha)|^2}{\langle |z_{xn}(\alpha)|^2\rangle + \langle |z_{nx}(\alpha)|^2\rangle + \langle |z_{nn}(\alpha)|^2\rangle}\bigg|_{\alpha=nT+\tau_p} \qquad [69]$$

and plugging Equations [49], [57], [61], and [68] into Equation [69] yields $$SNR = \frac{\left(\frac{\lambda_o}{4\pi}\right)^4 \left(\frac{G_t G}{s^2}\right)^2 4P^2 A^2}{\left(\frac{\lambda_o}{4\pi}\right)^2 \frac{G_t G}{s^2} 8PN \frac{1}{pT} + 4N^2 \frac{B}{pT}} \qquad [70]$$

where the approximation $s_o \sim s_n \sim s$ for the path length has been assumed. By defining $P_x$ as the signal power into a 0 dBi antenna, and $P_n$ as the system noise power, i.e., $$P_x \equiv \left(\frac{\lambda_o}{4\pi}\right)^2 \frac{G_t}{s^2} 2PA \qquad [71]$$

$$P_n \equiv 2NB$$

the SNR of the interferometric radio occultation is given by $$SNR = \frac{A\frac{GP_x}{P_n}}{2+A\frac{P_n}{GP_x}} BpT \qquad [72]$$

It is interesting to compare the SNR of Equation [72] to the $SNR_c$ that would be obtained for the radio occultation technique of Equations [1] through [14]. For this case, the $SNR_c$ would be given by $$SNR_c \equiv \frac{|z_{xx}(\alpha)|^2}{\langle |z_{xn}(\alpha)|^2\rangle}\bigg|_{\alpha=\tau_p} = \eta^2 A \frac{G_c P_x}{P_n} BnT \qquad [73]$$

where $\eta$ is the correlation loss due to deviations between the incoming and model codes caused by distortion in the GNSS transmitter. Assuming condition p=n as was done in Equation [33], this yields $$SNR = \frac{\frac{1}{\eta^2}\frac{G}{G_c}}{2+A\frac{P_n}{GP_x}} SNR_c \qquad [74]$$

For a receiver with a bandwidth matching that of the acquisition code (typically A~1), and neglecting the correlation loss ($\eta$~1), the antenna gain relationship that makes both SNR ratios the same is given by $$G = \left(1+\sqrt{1+\frac{P_n}{G_c P_x}}\right) G_c \qquad [75]$$

Accordingly, using an antenna of roughly twice the area, the same SNR as in the radio occultation technique of Equations [1] through [14] may be achieved by interferometric radio occultation.

Next, an analysis of clock drift and phase noise in interferometric radio occultation and respective results will be described. This analysis assumes the condition of Equation [33], namely $T_o$=pT=nT.

In interferometric radio occultation, the Doppler observable is obtained directly at the output of the correlator in Equation [29], while in the radio occultation technique of Equations [1] through [14], the carrier phase is the parameter extracted from the output of the correlator. Accordingly, in the latter, it may be time-differentiated between two consecutive readings of the carrier phase to arrive at the Doppler estimation of Equation [11]. This is shown in FIG. 6, which illustrates interferometric instruments (systems) for performing the interferometric radio occultation technique according to embodiments of the disclosure and the radio occultation technique of Equations [1] through [14], respectively. In FIG. 6, the upper panel illustrates an interferometric instrument (system) 600 for performing the interferometric radio occultation technique, and the lower panel illustrates an instrument for performing the radio occultation technique of Equations [1] through [14]. The interferometric instrument 600 substantially corresponds to the interferometric instrument 500 of FIG. 5. Accordingly, the interferometric instrument 600 comprises an antenna 650, an amplifier 610, a bandpass filter 620, and a multiplier 630 connected to a local oscillator of frequency $f_{LO}$ and phase $\varphi_{LO}$. The interferometric instrument 600 further comprises a correlator (auto-correlator) 640 outputting the Doppler observable. The auto-correlator 640 conceptually may be seen as comprising a direct path 642 and a delay path 644 adding a delay of $T_0$, a multiplier 646 multiplying the outputs of the direct path 642 and the delay path 644, and an integrator 648 for performing the actual correlation, based on the output of the multiplier 646. The direct path 642 may be said to correspond to the first signal, and the delay path 644 may be said to correspond to the second signal. The correlator 640 may be comprised by or implemented by a computation unit.

The instrument 700 in the lower panel of FIG. 6 comprises an antenna 750, an amplifier 710, a bandpass filter 720, and a multiplier 730 connected to a local oscillator of frequency $f_{LO}$ and phase $\varphi_{LO}$, similar to the interferometric instruments 500, 600. The instrument 700 further comprises a correlator (cross-correlator) 740 for correlating the clean reference signal with the received signal, and outputting the carrier phase observable. The correlator 740 may comprise a multiplier 746 for multiplying the clean reference signal with the received signal, and an integrator 748 for performing the actual correlation, based on the output of the multiplier 746. A direct path 762 and a delay path 764, the output of which is subtracted at adder 770 implement the differentiation of consecutive readings of the carrier phase determined from the output of the cross-correlator 740, to form the Doppler observable. The clean reference signal may be generated by a suitable signal generator.

To study the effect of clock drift and phase noise it shall be assumed that the ultra-stable oscillators at the transmitter (e.g., on board the GNSS satellites) and the receiver have some frequency drift, and the radio frequency (RF) and intermediate frequency (IF) local oscillators of the latter used to down-convert the received signal and up-convert the model signal, respectively, have a fluctuating phase.

First, clock drift and phase noise for the interferometric radio occultation technique will be discussed.

The signal component in the upper input branch (direct path 642) to the integrator block (integrator 646) in the upper panel of FIG. 6 is provided by Equation [38], removing the noise component, that is, by $$y_c(t) = \frac{\lambda_o \sqrt{G_t G}}{4\pi s} \sqrt{2P} \, x(t-u) \times e^{-j2\pi f_o u} e^{j2\pi (f_o - f_{LO})t} e^{-j\phi_{LO}} \quad [76]$$

Following Equation [39], the signal at the output of the correlator, at time t, is given by $$z(T_o + \tau; t) = \left(\frac{\lambda_o}{4\pi}\right)^2 \frac{G_t G}{s_o s_n} 2P \times \frac{1}{T_o} \quad [77]$$
$$\int_{t-T_o/2}^{t+T_o/2} x(t-u_o) x^*(t-T_o - \tau - u_o') e^{j2\pi (f_o' u_n - f_o u_o')}$$
$$e^{j2\pi (f_o - f_o')t} e^{-j2\pi (f_{LO} - f_{LO}')t} e^{j2\pi (f_o' - f_{LO}')(T_o + \tau)} e^{j(\phi_{LO}' - \phi_{LO})} dt$$

where the dependence with time t has been explicitly shown, the un-primed variables referring to time epoch t and the primed ones to time epoch $t-T_o$. When the correlation of Equation [77] is evaluated at its peak, i.e., at $\tau=\tau_p=u_o-u_n$, as given by Equation [26], this yields $$z(T_o + \tau_p; t) = \quad [78]$$
$$\left(\frac{\lambda_o}{4\pi}\right)^2 \frac{G_t G}{s_o s_n} 2P \times \frac{1}{T_o} \int_{t-T_o/2}^{t+T_o/2} x(t-u_o) x^*(t-T_o-u_o') e^{-j2\pi(df_o u_n + f_o du_o)}$$
$$e^{j2\pi df_{IF} t} e^{j2\pi f_{IF}'(T_o + du_o)} e^{-jd\phi_{LO}} dt$$

with $$u_o - u_n = du_o; \; f_o - f_o' = df_o; \; f_{LO} - f_{LO}' = df_{LO} \quad [79]$$
$$\phi_{LO} - \phi_{LO}' = d\phi_{LO}; \; f_o - f_{LO} = f_{IF}; \; f_{IF} - f_{IF}' = df_{IF}$$

Assuming that the path delay $u_o$, the GNSS clock frequency $f_o$, and the receiver local oscillator frequency $f_{LO}$ and phase $\varphi_{LO}$, are slowly varying linear functions of time, denoting their average value during the integration period $T_o$ with a bar, and making use of Equation [48], Equation [78] can be approximated by $$z(T_o + \tau_p; t) = \quad [80]$$
$$\left(\frac{\lambda_o}{4\pi}\right)^2 \frac{G_t G}{s_o^2} 2PA \times e^{-j2\pi(df_o \bar{u}_o + \bar{f}_o du_o)} e^{j2\pi df_{IF} t} e^{j2\pi \bar{f}_{IF}(T_o + du_o)} e^{-jd\phi_{LO}}$$

The Doppler observable is obtained, according to Equations [27]-[31], from the phase φ of the complex correlation in Equation [80], yielding $$f_D(t) = \frac{\varphi(t)}{2\pi T_o} \quad [81]$$

where $$\varphi(t) = -2\pi \bar{f}_o du_o + 2\pi \bar{f}_{IF}(T_o + du_o) - d\phi_{LO} - 2\pi df_o \bar{u}_o + 2\pi df_{IF} t \quad [82]$$

The impact of the clock drift and phase noise is contained in the last three terms of Equation [82], which translates into a Doppler error of $$\varepsilon_{f_D}(t) = -\frac{d\phi_{LO}}{2\pi T_o} - \frac{df_o}{T_o} \bar{u}_o + \frac{df_{IF}}{T_o} t \quad [83]$$

The first contribution to the Doppler error in the right hand side of Equation [83] is the phase noise of the local oscillator of the receiver. The second term is governed by the drift of the GNSS clocks. The last one is a combination of the latter and the rate of change of the local oscillator of the receiver, and defines the long-term drift of the Doppler error.

Next, clock drift and phase noise for the radio occultation technique of Equations [1] through [14] will be discussed.

According to the radio occultation technique of Equations [1] through [14], the lower input branch (delay path 734) to the correlator 740 in the lower panel of FIG. 6 is the same as in Equation [76], but the signal of the upper input branch (direct branch 732), $y_m$, is given by a model of the acquisition code $x_{Tm}$, i.e., by $$y_m(t) = x_{Tm}(t) \quad [84]$$

The output of the correlator, in this case, is given by $$z(\tau; t) = \frac{1}{T} \int_{t-T_o/2}^{t+T_o/2} y_c(t) y_m^*(t-\tau) dt \quad [85]$$

and substituting $y_c$ and $y_m$ in Equation [85] by Equations [76] and [84] yields $$z(\tau; t) = \frac{\lambda_o \sqrt{G_t G}}{4\pi s_o} \sqrt{2P} \times \frac{1}{T_o} \quad [86]$$
$$\int_{t-T_o/2}^{t+T_o/2} x(t-u_o) x_{Tm}^*(t-\tau) e^{-j2\pi f_o u_o} e^{j2\pi f_{IF} t} e^{-j\phi_{LO}} dt$$

The correlation of Equation [86] may now be evaluated at the peak, i.e., for $\tau=\tau_p=u_o$, and using the same assumptions as for the interferometric radio occultation technique, this yields $$z(\tau_p; t) = \frac{\lambda_o \sqrt{G_t G}}{4\pi s_o} \sqrt{2P} \, A e^{-j2\pi \bar{f}_o \bar{u}_o} e^{j2\pi \bar{f}_{IF} t} e^{-j\phi_{LO}} \quad [87]$$

where it has been assumed that the model of the acquisition code is a faithful replica of the real one, i.e.

$$\frac{1}{T_o} \int_{t-T_o/2}^{t+T_o/2} x(t-u_o) x_{Tm}^*(t-u_o) dt = A \quad [88]$$

The phase of the complex correlation in Equation [87] is given by $$\varphi(t) = -2\pi \bar{f}_o \bar{u}_o - \varphi_{LO} + 2\pi \bar{f}_{IF} t \quad [89]$$

and the Doppler estimation is derived from two consecutive phase readings (see the lower panel of FIG. 6) via $$f_D(t) = \frac{\varphi(t) - \varphi(t - T_o)}{2\pi T_o} \quad [90]$$

The differential phase in the numerator of Equation [90] is given by $$\varphi(t) - \varphi(t-T) = -2\pi \bar{f}_o du_o + 2\pi \bar{f}_{IF} T_o - s\varphi_{LO} - 2\pi df_o \\ \bar{u}_o + 2\pi df_{IF} t \quad [91]$$

wherein the last line reflects the impact of clock imperfections. Comparing this result to Equation [82] leads to the conclusion that the impact of clock drifts and phase noise on the Doppler observations is the same in both approaches, that is, $$\varepsilon_{f_D,C}(t) = \varepsilon_{f_D}(t) \quad [92]$$

Notably, if the complex correlation loss factor (of modulus $\eta$ and phase $\varphi_n$) is considered in Equation [88], $$\frac{1}{T_o} \int_{t-T_o/2}^{t+T_o/2} x(t - u_o) x_{Tm}^*(t - u_o) dt = A\eta e^{j\phi_\eta} \quad [93]$$

then an additional degradation contribution in the Doppler observations according to the radio occultation technique of Equations [1] through [14] appears, such that $$\varepsilon_{f_D,C}(t) = \varepsilon_{f_D}(t) + \frac{d\varphi_\eta(t)}{2\pi T_o} \quad [94]$$

Next, satellite discrimination in the context of the interferometric radio occultation technique according to embodiments of the disclosure will be described.

Table 1 presents the period of the acquisition codes of different GNSS systems in two frequency bands, around L1/E1 and L5/E5. All GNSS systems have acquisition codes with 1 ms period in both bands except for GALILEO, which has tiered PRN ranging codes of different length, of which the shortest has length 4 ms. The interferometric radio occultation technique can therefore be applied to all GNSS systems and frequency bands shown in Table 1, by virtue of their acquisition code lengths.

TABLE 1

Period of PRN acquisition codes of different GNSS systems in two frequency bands, F1 (around E1/L1) and F5 (around E5/L5).

|    | GPS  | GLONASS | GALILEO    | BeiDou | QZSS |
|----|------|---------|------------|--------|------|
| F1 | 1 ms | 1 ms    | 4, 100 ms  | 1 ms   | 1 ms |
| F5 | 1 ms | 1 ms    | 4, 20, 100 ms | 1 ms | 1 ms |

As indicated above, the interferometric radio occultation technique does not discriminate between GNSS satellites. Nevertheless, as will now be shown, the spatial filtering of an antenna of modest size is sufficient to avoid satellite cross talk. This is partly because radio occultation events happen relatively seldom.

Figure 7:
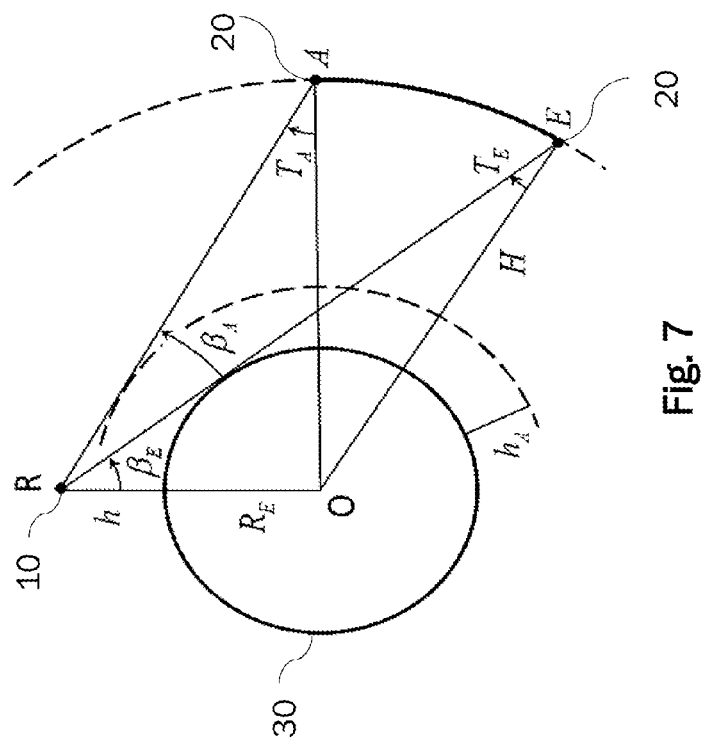

Assume the radio occultation receiver R orbiting the Earth at a height h over its surface, as depicted in FIG. 7. Reference numbers in this figure correspond to those in FIG. 1. The solid angle $\Omega_A$, measured from R, subtended by a layer of thickness $h_A$ of the atmosphere, is given by $$\Omega_A = 2\pi(\cos(B_E + T_E) - \cos(\beta_E + \beta_A + T_A)) \quad [95]$$

with $$\beta_E = \arcsin \frac{R_E}{R_E + h}; \quad [96]$$

$$T_E = \arcsin \frac{R_E}{R_E + H}$$

$$\beta_A = \arcsin \frac{R_E + h_A}{R_E + h} - \beta_E;$$

$$T_A = \arcsin \frac{R_E + h_A}{R_E + H}$$

Assuming a total number of M GNSS satellites evenly distributed on the surface of a sphere of radius H (GNSS orbit), the average number of radio occultation events N at any time is found to be $$N = \frac{M}{4\pi} \Omega_A \quad [97]$$

Taking h=800 km (LEO orbit), H=20920 km (average height of GPS, GLONASS, BEIDOU and GALILEO), an atmospheric layer of $h_A$=250 km and M=132 (33 satellites per each one of the previous GNSS constellations), then $\beta_E$=62.7°, $\beta_A$=4.7° and N=6, providing an average azimuth separation of $\Delta A$=60°.

Assuming a circular antenna of diameter D pointed nadir at R, the solid angle $\Omega_L$ of a beam pointed towards the Earth limb will be $$\Omega_L = \frac{\lambda_{F5}^2}{\pi \left(\frac{D}{2}\right)^2 \zeta_h} \quad [98]$$

where $$\zeta_h = \cos(\beta_E + \beta_A) \quad [99]$$

To provide the necessary spatial filtering, this solid angle has to match the average solid angle per GNSS satellite, i.e.

$$\Omega_L = \frac{4\pi}{M} = 0.096 \, sr \quad [100]$$

and therefore $$D = \frac{\lambda_{F5}}{\pi} \sqrt{\frac{M}{\zeta_h}} = 1.5 \, m \quad [101]$$

The azimuth $\theta_A$ and elevation $\theta_E$ beam dimensions provided this antenna will be such that $$\theta_A \theta_E = \Omega_L \quad [102]$$

$$\theta_E = \frac{\theta_A}{\zeta_h} \quad [103]$$

Hence, $$\theta_A = \sqrt{\Omega_L \zeta_h} = 11° < \Delta A \quad [104]$$

$$\theta_E = \sqrt{\frac{\Omega_L}{\zeta_h}} = 28.6° \quad [105]$$

In conclusion, a 1.5 m circular antenna from 800 km altitude, pointed nadir could perform interferometric radio occultation providing the required spatial filtering for satellite discrimination. This example shows that a practical realization of the interferometric radio occultation technique is possible.

Next, antenna size will be discussed in the context of the interferometric radio occultation technique according to embodiments of the disclosure. The size of the antenna which would achieve the same SNR as the above example, using the radio occultation technique of Equations [1] through [14] can be estimated from Equation [75] by solving for $G_c$, $$G_c = \frac{1}{2 + \frac{P_n}{GP_x}} G \quad [106]$$

Neglecting atmospheric attenuation and considering a nominal received power $P_x$ at the lower navigation band E5/L5 (worst case band) of −154 dBW, a receiver bandwidth of B=20 MHz and an equivalent system noise temperature of $T_{sys}$=290 K, the noise to power ratio in Equation [106] becomes $$\frac{P_n}{P_x} = \frac{kT_{sys}B}{P_x} = 201 \quad [107]$$

Since one further has $$G = \frac{4\pi}{\Omega_L} = M \quad [108]$$

G=132 (21.2 dB) is found and $$G_c = \frac{1}{2 + \frac{201}{M}} M = 37.5 \ (15.7 \text{ dB}) \quad [109]$$

The corresponding diameter $D_c$ of a nadir pointed antenna can be obtained through Equations [99] and [108] applied to $G_c$, i.e.

$$\frac{4\pi}{G_c} = \frac{\lambda_{F5}^2}{\pi \left(\frac{D_n}{2}\right)^2 \zeta_h} \quad [110]$$

or, making use of Equation [101], $$D_c = \sqrt{\frac{G_c}{M}} D = 0.53 \times D \quad [111]$$

That is, an antenna of half the diameter can achieve the same SNR when the radio occultation technique of Equations [1] through [14] is used. This result stems from the intrinsically lower SNR of the interferometric technique. Nevertheless, despite requiring a larger antenna, there is a good reason to consider the latter technique. In GNSS reflectometry, a similar interferometric approach has been shown to lead to a range precision better than the conventional one by a factor between 2 and 4, in proportion to the antenna gain. Antennas of the order of 1-2 m diameter are typically needed in reflectometry as the performance drops significantly for lower values of antenna gain. Then, accepting the size of the down-looking antenna of a GNSS reflectometry instrument, it makes sense to consider the use of an analogue technique also for radio occultation. Under this perspective, Equation [109] can be interpreted as follows: a 1.5 m nadir pointed interferometric antenna is equivalent to having a 15.7 dB antenna in every azimuth direction in the radio occultation technique of Equations [1] through [14], for elevations for which the atmospheric attenuation can be neglected.

The impact of loss due to the atmospheric attenuation is discussed next.

In interferometric radio occultation according to embodiments of the disclosure, the received signal (e.g., the first signal) is used as reference, and hence, its amplitude is critical for the performance of the method. It is thus important to quantify the impact of the atmospheric loss in the SNR. Above 40 km height, the atmosphere can be considered transparent. In the lower part of the stratosphere and up to the troposphere, the attenuation increases, and can reach, in the worst case, a few dB. In the upper troposphere, between 10 and 5 km height, the atmosphere can exhibit considerably higher losses, from 10 dB up to 20 dB, respectively. In the lower 5 km multipath can occur, causing fading, i.e., severe attenuation of the signal, which can reach about 30 dB.

To quantify the SNR in the presence of atmospheric loss, the received signal power $P_x$ in Equations [73] and [74] is factored into the signal power $P_{xo}$ that would be received in a transparent atmosphere, and the loss L introduced by the atmosphere:

$$P_x = LP_{xo} \quad [112]$$

That is, $$SNR_c = \eta^2 AG_c L \frac{P_{xo}}{P_n} BnT \quad [113]$$

and $$SNR = \frac{\frac{1}{\eta^2} \frac{G}{G_c}}{2 + \frac{A}{GL} \frac{P_n}{P_{xo}}} SNR_c \quad [114]$$

Using the same set of parameter values as above (i.e., η~1, A~1, B=20 MHz, $P_{xo}$=−154 dBW, $T_{sys}$=290 K and G=21.2 dB), together with a typical antenna gain pattern used in the radio occultation technique of Equations [1] through [14] (11 dB at boresight and 7 dB at the field of view edge) and an integration time of nT=50 ms, it is found that the interferometric radio occultation technique performs well in the stratosphere and upper part of the troposphere, but may suffer of a lower signal to noise ratio, by comparison with the radio occultation technique of Equations [1] through [14], in the first 5 km of the troposphere.

In order to improve the performance of interferometric radio occultation in the lower part of the troposphere, the reference signal (e.g., first signal) may be frozen (i.e., received) at the top of this layer, when the atmospheric attenuation is not too high, by progressively increasing the value of p in Equation [21] beyond that point. The practical implementation of this strategy for a setting occultation is rather straightforward. However, for a rising occultation the received signal would have to be stored in memory until reaching the tangent height at the top of the troposphere, at which moment the auto-correlation process would be run backwards. Storing tens of seconds, as it would be necessary, of the high-rate sampled received signal is very demanding, as extremely long memory buffers would have to be provided.

Further approaches to increase the SNR of the interferometric radio occultation technique are described below. First, a technique referred to as zenithal interferometric radio occultation, that corresponds to a special case of the interferometric radio occultation technique described above will be described.

In zenithal interferometric radio occultation, one of the first timing and the second timing (e.g., the first timing) may be a timing at which the satellite is at a substantially zenithal position with respect to the receiver, and the other one of the first timing and the second timing (e.g., the second timing) may be a timing at which the satellite is in occultation by the portion of atmosphere with respect to the receiver. The timing offset between the first timing and the second timing may be an integer multiple nT of the repetition period T, where n is chosen such that the first and second timings satisfy the above condition. The zenithal position may be a position at which the angle of inclination of the satellite with respect to the zenith of the location of the receiver is within a given range, such as ±30° (degrees). Unless indicated otherwise, the steps of the zenithal interferometric radio occultation technique are identical to corresponding steps of the interferometric radio occultation technique described above.

To avoid the need of a large memory to store the received signal of a rising occultation when the reference signal is taken at the top of the troposphere, it is desirable to have the reference signal already available as soon as the rising occultation starts. This calls for an alternative approach to interferometric radio occultation, in which the reference signal is acquired before any occultation actually happens, so that it can be used simply when needed. Implicitly, this means to decouple the acquisition of the reference signal from the occultation event itself, which can therefore be optimized for best SNR independently of the occultation. Such optimization may depend on instrument details.

As mentioned earlier, the interferometric radio occultation technique may be used as an add-on capability to an interferometric GNSS reflectometry instrument. The assumed instrument architecture may therefore be the one described in Martin-Neira, M., D'Addio, S., Buck, C., Floury, N., & Prieto-Cerdeira, R. (2011), The PARIS ocean altimeter in-orbit demonstrator, IEEE Transactions on Geoscience and Remote Sensing, 49(6), 2209-2237, which includes a particular antenna consisting of two high-gain beamforming arrays, mounted back-to-back, pointed along the zenith-nadir direction. With such antenna, the reference signal (e.g., the first signal) to be used for interferometric radio occultation can be acquired around the zenithal region for best SNR. That is, when a GNSS satellite is at high elevation above the up-looking antenna, a convenient number p of periods of its acquisition code can be received through one of the up-looking high-gain beams, and recorded. For this reason, as mentioned above, the modified technique shall be referred to as Zenithal Interferometric Radio Occultation. In a strict sense, it is only necessary to store p=1 periods of the acquisition code, and hence, the length of the required memory is very affordable. However, a plurality of (e.g., few) periods may be recorded when longer integration times with p>1 are desired in the processing of zenithal interferometric radio occultation.

Figure 8:
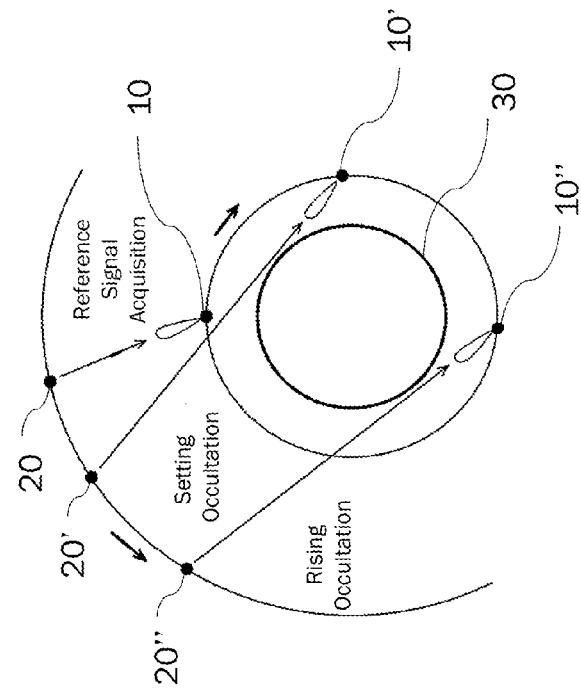

FIG. 8 shows the two stages of zenithal interferometric radio occultation: First, the reference signal (e.g., first signal) transmitted by the transmitter 20 is acquired at a high-elevation pass above the up-looking antenna at the receiver 10. Second, the acquired reference signal is cross-correlated with the signal (e.g., second signal) received through a down-looking antenna beam at the receiver 10', 10" during a rising or setting occultation of the corresponding GNSS satellite 20', 20", respectively.

Figure 9:
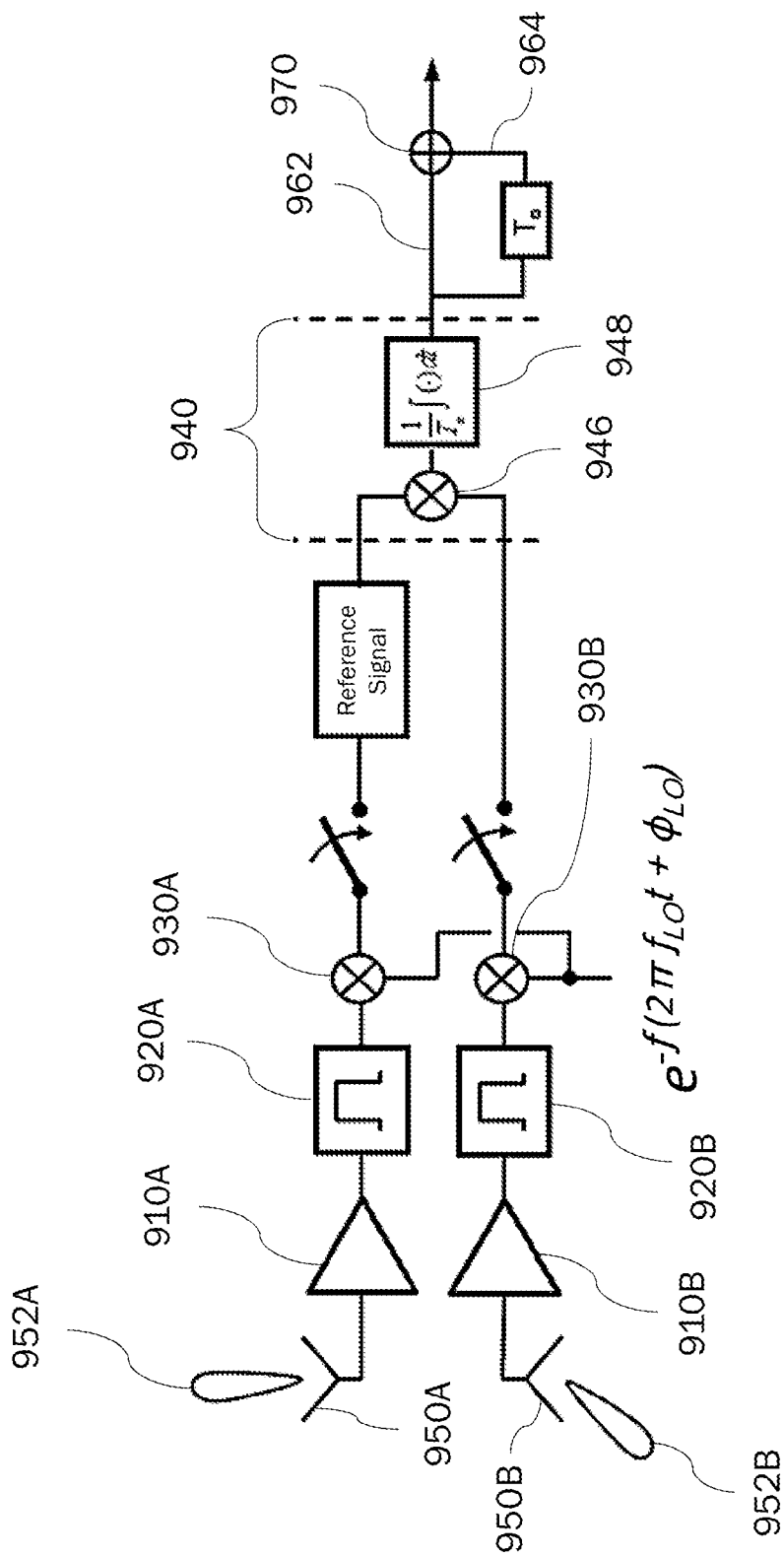
FIG. 9 illustrates a conceptual block diagram of a system for performing an example of the interferometric technique for radio occultation according to embodiments of the disclosure that is referred to as Zenithal Interferometric Radio Occultation.

FIG. 9 illustrates a conceptual block diagram of zenithal interferometric radio occultation. Unless indicated otherwise, explanations made above with reference to FIG. 5 and FIG. 6 apply also here. According to this block diagram, the reference signal (e.g., first signal) and the signal received during the actual occultation event (e.g., second signal) are received by respective zenith pointed and nadir pointed antennas 952A, 952B, amplified by respective amplifiers 910A, 910B, bandpass filtered by respective bandpass filters 920A, 920B and down-converted by respective multipliers 930A, 930B connected to a local oscillator of frequency $f_{LO}$ and phase $\varphi_{LO}$. The reference signal is received via high-elevation beam 952A of the (zenith pointed) antenna 950A, and the signal received during the occultation event is received via earth-limb beam 952B of the (nadir pointed) antenna 950B. The reference signal may be stored, and the reference signal and the signal received during the occultation event may be provided with appropriate timing to a multiplier 946 and an integrator 948 forming a correlator (cross-correlator) 940. This is schematically indicated by switches in the respective signal paths. The consecutive outputs of the correlator 940 (for the same reference signal and different signals received during the occultation event) may be differentiated with respect to time, yielding the Doppler observable as output. This differentiation with respect to time is schematically indicated by signal paths 962, 964 and adder 970 (the signal paths and the adder forming a differentiation unit differentiation unit), similar to FIG. 7. The correlator 940 and the differentiation unit may be comprised by or implemented by a computation unit.

Next, the SNR of zenithal interferometric radio occultation will be computed, following the same steps as followed above:

Signal term $|z_{xx}(\alpha)|^2$: Using Equation [49], it is easy to show that the power of the signal term now becomes $$|z_{xx}(nT+\tau_p)|^2 = \left(\frac{\lambda_o}{4\pi}\right)^2 \left(\frac{G_t}{s_o s_n}\right)^2 G_o L G_n 4 P^2 A^2 \quad [115]$$

where $G_o$, $s_o$, $G_n$ and $s_n$ refer to the antenna gain and path length during reference signal acquisition and occultation event, respectively, and L is the atmospheric loss.

Signal times noise term $|z_{xn}(\alpha)|^2$: From Equation [57] it follows that $$\langle|z_{xn}(nT+\tau_p)|^2\rangle = \left(\frac{\lambda_o}{4\pi}\right)^2 \frac{G_t G_o}{s_o^2} 4PN \frac{1}{pT} \quad [116]$$

Noise times signal term $|z_{nx}(\alpha)|^2$: From Equation [61], and taking into account the atmospheric loss, it follows that $$\langle|z_{nx}(nT+\tau_p)|^2\rangle = \left(\frac{\lambda_o}{4\pi}\right)^2 \frac{G_t L G_n}{s_n^2} 4PN \frac{1}{pT} \quad [117]$$

Noise term $|z_{nn}(\alpha)|^2$: This term is the same as in Equation [68] above.

Plugging Equations [115] through [117] and [68] into Equation [69] yields the $SNR_Z$ of zenithal interferometric radio occultation, $$SNR_Z = \frac{\left(\frac{\lambda_o}{4\pi}\right)^4 \left(\frac{G_t}{s_o s_n}\right)^2 G_o L G_n 4P^2 A^2}{\left(\frac{\lambda_o}{4\pi}\right)^2 G_t \left(\frac{G_o}{s_o^2} + \frac{LG_n}{s_n^2}\right) 4PN \frac{1}{pT} + 4N^2 \frac{B}{pT}} \quad [118]$$

Recalling that $P_{xo}$ is the signal power component of the reference acquisition code that would be received in a transparent atmosphere, that is, $$P_{xo} \equiv \left(\frac{\lambda_o}{4\pi}\right)^2 \frac{G_t}{s_o^2} 2PA \quad [119]$$

one obtains $$SNR_Z = \frac{A \frac{LG_n P_{xo}}{P_n}}{\left(1+\frac{LG_n}{G_o}\right)+A\frac{P_n}{G_o P_{xo}}} BpT \quad [120]$$

Inserting Equation [112] into Equation [73], and combining the result with Equation [120] yields, for p=n, $$SNR_Z = \frac{\frac{1}{\eta^2}\frac{G_n}{G_c}}{\left(1+\frac{LG_n}{G_o}\right)+A\frac{P_n}{G_o P_{xo}}} SNR_c \quad [121]$$

Equation [121] is very similar to Equation [74]. However, while the latter was only valid for a transparent atmosphere, the former holds for any value L of atmospheric loss.

The $SNR_Z$ of zenithal interferometric radio occultation can now be computed, using Equation [121], for the example of a GNSS reflectometry instrument of the same size as that described in the above discussion of antenna size in the context of the interferometric radio occultation technique, i.e., one having a 1.5 m diameter antenna. In this case, $$G_o = \frac{M}{2\zeta_h} = 171.7 \text{ (22.3 dB)} \quad [122]$$

$$G_n = M = 132 \text{ (21.2 dB)} \quad [123]$$

where $G_o$ has been taken as the antenna gain at −3 dB from the peak value, which corresponds to an elevation angle of about 60° above the up-looking antenna. Therefore, a range of $SNR_Z$ has been computed corresponding to reference signal acquisition occurrences within 22.3≤$G_o$≤25.3 dB, depending on proximity of the GNSS satellite to zenith.

Making the same assumptions as used in the above discussion of antenna size in the context of the interferometric radio occultation technique, namely A~1, η~1, $G_c$=11 dB (only the value of $G_c$ at boresight is taken to compute $SNR_Z$, as the latter does not change with azimuth), and $P_n/P_{xo}$=201, the proposed strategy to acquire the reference signal when the GNSS satellites are in the zenithal region is found to solve the problem of comparatively low SNR, namely that interferometric radio occultation had to sample the lower troposphere due to its high propagation loss.

Next, (GNSS) satellite discrimination in the context of the zenithal interferometric radio occultation technique will be discussed.

In pure interferometric radio occultation in which both the first timing and the second timing are timings at which the satellite is in occultation with respect to the receiver, e.g., implemented as in FIG. 6, any GNSS satellite inside the antenna beam has some significant contribution to the auto-correlation function because the technique is built to achieve precisely this, i.e., there is no discrimination through either code-delay or Doppler frequency shift. The separation of signals coming from different GNSS satellites may be performed spatially, i.e., through the antenna pattern.

In zenithal interferometric radio occultation, instead, the reference signal is acquired in a geometry very different from that of the occultation event. A Doppler shift has to be applied to the acquired reference prior to the cross-correlation with the occultation signal, and the peak of the cross-correlation appears at a particular code chip delay. This means that zenithal interferometric radio occultation does provide delay and Doppler discrimination capability, contrary to the earlier interferometric technique, and hence, there is no strict requirement on the antenna size from the point of view of spatial filtering anymore.

As an example, assume that there are several GNSS satellites within the up-looking antenna beam during the acquisition of the reference signal of one particular GNSS satellite. Then, at the corresponding occultation event, the down-looking antenna beam is directed towards the Earth limb region where the desired GNSS satellite is located. The other GNSS satellites whose signal was received through the up-looking beam are not necessarily also within the down-looking beam at the moment of the said occultation, simply because the overall geometry has changed. Assume further that, still, there is a remaining common set of unwanted GNSS satellites in the up- and down-looking beams involved in the occultation event. The frequency shift of the sought occultation signal, applied to the reference signal, will generally not match that of the signals from the unwanted GNSS satellites, and they will be filtered out by the cross-correlation operation. Any unwanted signal surviving the change of geometry and the frequency discrimination in the cross-correlation will peak, in general, at a different code chip delay than the signal from the wanted satellite, appearing with a delay separation from the wanted signal peak in the cross-correlation waveform.

In conclusion, there are four GNSS satellite discrimination filters actuating in zenithal interferometric radio occultation: the antenna beam itself (regardless of its actual shape), the changing geometry of the GNSS satellites from the moment of reference signal acquisition to the moment of the occultation event, the frequency matching discrimination and, finally, the delay selectivity.

Next, antenna size in the context of the zenithal interferometric radio occultation technique will be discussed.

As explained above, in zenithal interferometric radio occultation the size of the antenna is no longer determined by the need to spatially discriminate the different GNSS satellites. Therefore it shall be assumed that the dimension of the antenna is set by constraints related to the GNSS reflectometry application, and that the antenna is of the type described in Martin-Neira, M., D'Addio, S., Buck, C., Floury, N., & Prieto-Cerdeira, R. (2011), The PARIS ocean altimeter in-orbit demonstrator, IEEE Transactions on Geoscience and Remote Sensing, 49(6), 2209-2237, i.e., a zenith-nadir pointed reflectometry antenna.

Since the size of the antenna drives the signal to noise ratio $SNR_Z$, two cases of interest may be considered: The first one corresponds to an antenna of a size such that $SNR_Z$ matches $SNR_C$ for the radio occultation technique of Equations [1] through [14] in the lower troposphere, when the atmospheric attenuation L is large, and the second one is an antenna of 0.9 m diameter, similar to what might be flown in ESA's GEROS-ISS experiment aboard the International Space Station.

To find the dimension of the antenna that makes $SNR_C = SNR_Z$ it is necessary that, in Equation [121], one has $$\frac{1}{\eta^2} \frac{G_n}{G_c} = \left(1 + \frac{LG_n}{G_o}\right) + A \frac{P_n}{G_o P_{xo}} \qquad [124]$$

Assuming A~1 and η~1, as usual, high atmospheric losses (very small L), $G_p$ being the peak antenna directivity and $$G_o = \frac{G_p}{2} \qquad [125]$$

$$G_n = G_o \zeta_h \qquad [126]$$

then Equation [124] can be solved for $G_p$, yielding $$G_p = \left(1 + \sqrt{1 + \frac{\zeta_h}{G_c} \frac{P_n}{P_{xo}}}\right) \frac{G_c}{\zeta_h} \qquad [127]$$

Inserting the exemplary values, $G_c$=11 dB, $P_n/P_{xo}$=201 and for $\zeta_h$=800 km into this equation, as done above, yields $G_p$=20.8 dB and an antenna diameter of $$D = \frac{\lambda_{F5}}{\pi} \sqrt{G_p} \qquad [128]$$

that is, D=0.89 m is obtained. The corresponding $SNR_Z$ is found to be only slightly above the $SNR_C$ of the radio occultation technique of Equations [1] through [14] for all tangent heights, in particular in the lower troposphere. It is important to remark the fact that the signal to noise ratio $SNR_Z$ of the zenithal interferometric radio occultation is constant over azimuth, while in the radio occultation technique of Equations [1] through [14], the signal to noise ratio $SNR_C$ degrades with boresight angle. In conclusion, an 89 cm diameter GNSS reflectometry instrument can perform zenithal interferometric radio occultation achieving slightly better SNR than typical instruments for the radio occultation technique of Equations [1] through [14], regardless of azimuth angle.

Notably, the zenithal interferometric radio occultation technique requires apertures of smaller size than those needed in the purely interferometric radio occultation technique for a given SNR performance.

In the case of ESA's GEROS-ISS experiment, the antenna diameter is of the same order of magnitude as the previous case (D=89 cm), but the orbital height is only of about 400 km. From this lower orbit, the boresight angle at which the top limit of the atmosphere is seen by the down-looking antenna increases up to $(\beta_E+\beta_A)$=76.6°, which reduces the value of in Equation [99], and hence, the value of $G_n$ in Equation [126]. Taking this into account, the signal to noise ratio $SNR_Z$ can be computed using Equation [121]. It is found that in the context of the GEROS-ISS experiment, a similar performance with zenithal interferometric radio occultation would be obtained as with as the radio occultation technique of Equations [1] through [14].

It is also interesting to compare the performance of zenithal interferometric radio occultation in GEROS-ISS against that of the radio occultation technique of Equations [1] through [14] when both methods were implemented in parallel in this mission, i.e., using the same reflectometry antenna. For this comparison, only the corresponding signal to noise ration $SNR_C$ has to be computed, using Equations [73] and [112] with $$G_c = G_p \zeta_h = G_p \cos(\beta_E+\beta_A) \qquad [129]$$

Taking $G_p$=20.8 dB, $(\beta_E+\beta_A)$=76.6°, and the other usual assumptions (A~1, η~1, $P_n/P_{xo}$=201, B=20 MHz, nT=50 ms), then $G_c$=14.5 dB, and it is found that the signal to noise ratio $SNR_C$ of the radio occultation technique of Equations [1] through [14] is between 4 and 7 dB higher than that of zenithal interferometric radio occultation. This confirms the latter technique as a very useful add-on to a GNSS-R interferometric instrument. This also shows the potential of the reflectometry antenna in Martin-Neira, M., D'Addio, S., Buck, C., Floury, N., & Prieto-Cerdeira, R. (2011), The PARIS ocean altimeter in-orbit demonstrator, IEEE Transactions on Geoscience and Remote Sensing, 49(6), 2209-2237, to perform radio occultation using the radio occultation technique of Equations [1] through [14].

A further approach to increase the SNR of the interferometric radio occultation technique will be described next. Also this technique corresponds to a special case of the interferometric radio occultation technique described above.

As described above, zenithal interferometric radio occultation may improve the SNR of the interferometric radio occultation technique in the lower troposphere. It consists in acquiring the reference signal when the GNSS satellite is at high elevation angle over the up-looking antenna. However, if it is advantageous or inevitable to use the same antenna for acquiring the signal during the occultation event (e.g., the second signal) as for acquiring the reference signal (e.g., the first signal), the latter has to be received through the down-looking antenna, at the highest elevation possible. This angle corresponds to the complementary angle to $(\beta_E+\beta_A)$ in FIG.

7, when the atmospheric attenuation is negligible. In other words, one of the first timing and the second timing (e.g., the first timing) may be a timing at which the (GNSS) satellite is on the point of entering or leaving occultation by the atmosphere with respect to the receiver, and the other one of the first timing and the second timing (e.g., the second timing) is a timing at which the (GNSS) satellite is in occultation by the portion of atmosphere with respect to the receiver. The timing offset between the first timing and the second timing may be an integer multiple nT of the repetition period T, where n is chosen such that the first and second timings satisfy the above condition. This technique will be referred to as top of the atmosphere reference signal acquisition or top of the atmosphere interferometric radio occultation. Unless indicated otherwise, the steps of the zenithal interferometric radio occultation technique are identical to corresponding steps of the interferometric radio occultation technique described above with reference to FIG. 12.

Figure 10:
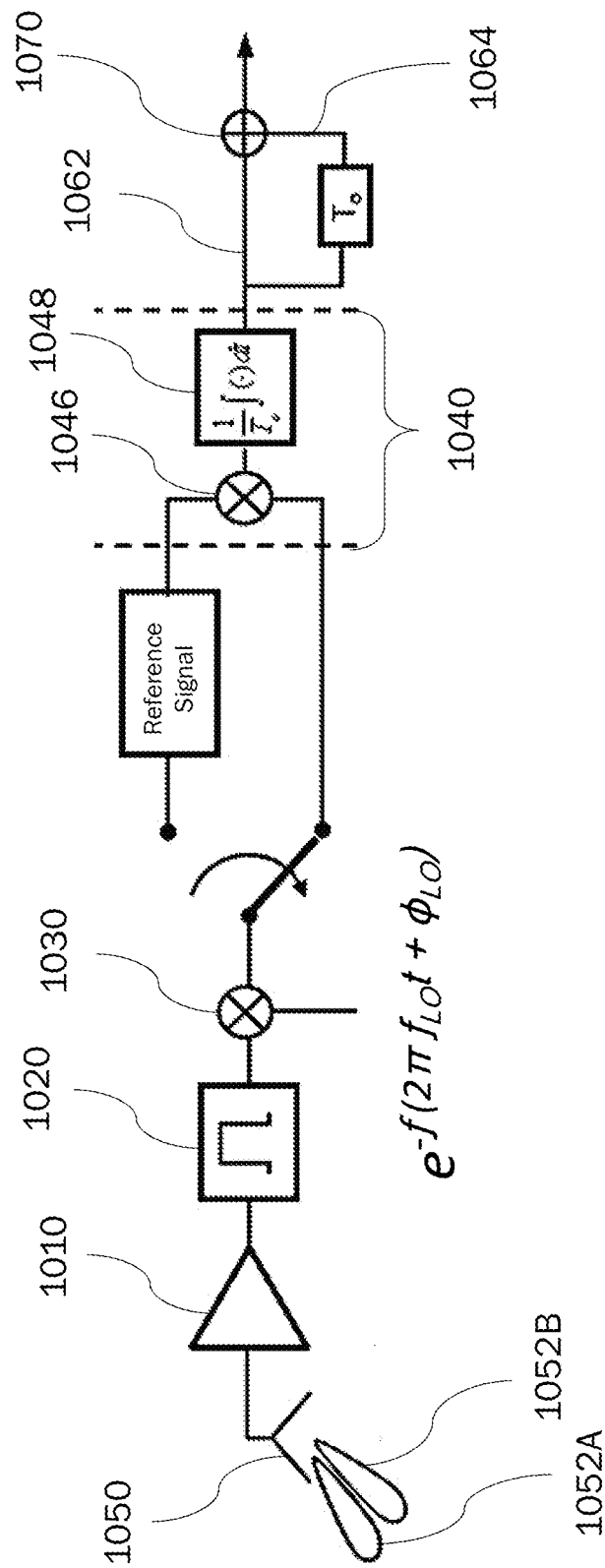
FIG. 10 illustrates a conceptual block diagram of a system for performing an example of the interferometric technique for radio occultation according to embodiments of the disclosure that is referred to as Top of the Atmosphere Interferometric Radio Occultation, FIG. 11 schematically illustrates respective geometries for examples of the interferometric technique for radio occultation according to embodiments of the disclosure.

A block diagram of top of the atmosphere reference signal acquisition is depicted in FIG. 10. Unless indicated otherwise, explanations made above with reference to FIG. 5, FIG. 6, and FIG. 9 apply also here. The block diagram of this figure is different from the block diagram of FIG. 9 in that now both the reference signal (e.g., first signal) and the signal (e.g., second signal) received during the actual occultation event are acquired using the same (nadir pointed) antenna 1050. Both signals are amplified by an amplifiers 1010 bandpass filtered by a bandpass filter 1020 and down-converted by a multipliers 1030 connected to a local oscillator of frequency $f_{LO}$ and phase $\varphi_{LO}$. The reference signal is received via top of atmosphere beam 1052A of the antenna 1050, and the signal received during the occultation event is received via earth-limb beam 1052B of the antenna 1050. The reference signal may be stored, and the reference signal and the signal received during the occultation event may be provided with appropriate timing to a multiplier 1046 and an integrator 1048 forming a correlator (cross-correlator) 1040. This is schematically indicated by the switch connecting to respective signal paths. The consecutive outputs of the correlator 1040 (for the same reference signal and different signals received during the occultation event) may be differentiated with respect to time, yielding the Doppler observable as output. This differentiation with respect to time is schematically indicated by signal paths 1062, 1064 and adder 1070 (the signal paths and the adder forming a differentiation unit). The correlator 1040 and the differentiation unit may be comprised by or implemented by a computation unit.

The $SNR_D$ when the reference signal is acquired through the down-looking antenna can be derived from Equation [120] by setting $G_o=G_n=G_p\zeta_h$, and is given by $$SNR_D = \frac{A\dfrac{LG_n P_{xo}}{P_n}}{1+L+A\dfrac{P_n}{G_n P_{xo}}} BpT \qquad [130]$$

Comparing Equation [130] to Equation [120], it is found that $SNR_T$ is smaller than the maximum $SNR_Z$, but both get closer together with higher orbital altitudes of the LEO satellite. For example, for a 0.89 m diameter antenna, the difference between the maximum $SNR_Z$ and $SNR_D$ is of 4.9 dB at 400 km orbital altitude and 0 km tangent height, and reduces down to 2 dB at 1300 km orbital altitude. Accordingly, acquiring the reference signal from the top of the atmosphere may be convenient for LEO satellites flying above 1000 km. Notably, the higher the LEO altitude, the better the signal to noise ratio of both zenithal interferometric radio occultation and top of the atmosphere interferometric radio occultation.

Figure 11:
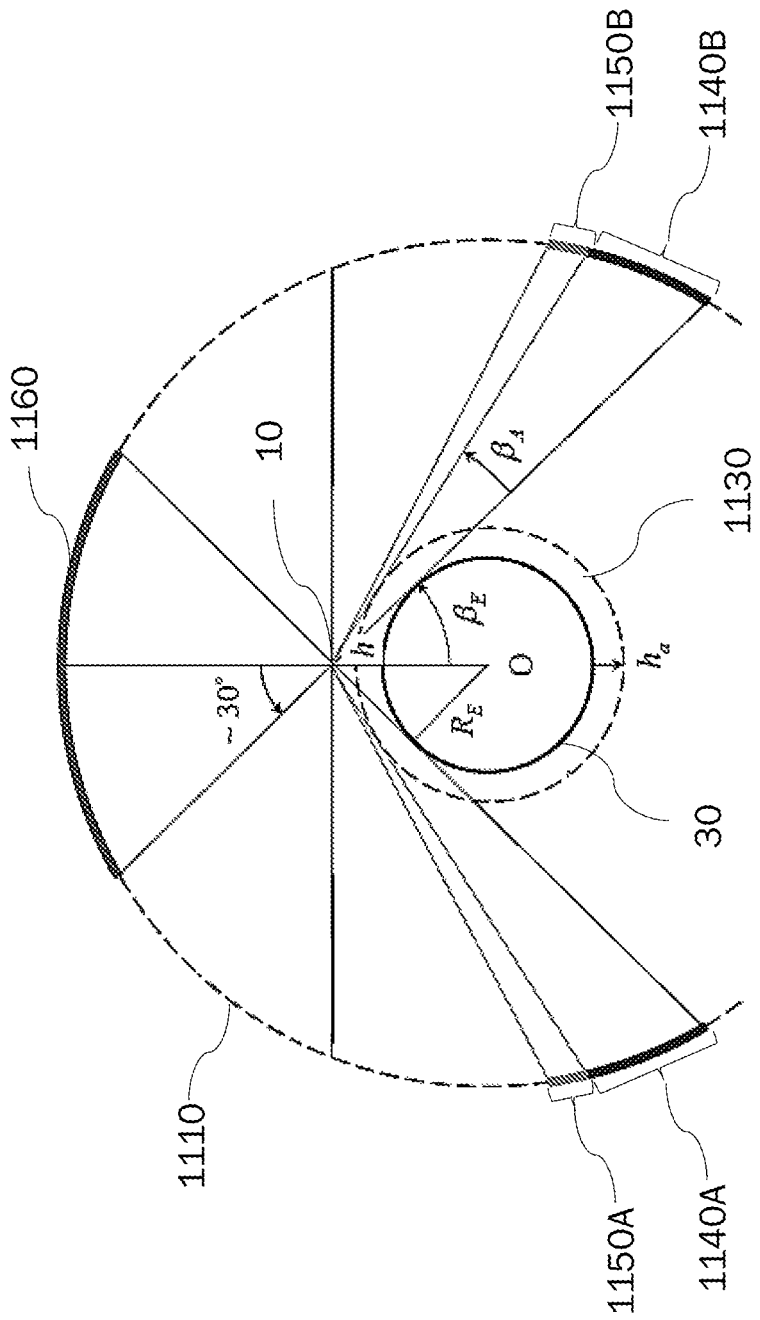

FIG. 11 schematically illustrates respective geometries for examples of the interferometric technique for radio occultation according to embodiments of the disclosure, namely for pure interferometric radio occultation, zenithal interferometric radio occultation and top of the atmosphere interferometric radio occultation. Reference number 10 indicates the (observation) satellite (or rather, its position), 30 indicates Earth, and 1130 indicates Earth's atmosphere. Further, ranges of orbital positions of (GNSS) satellites at which the reference signal (e.g., first signal) in pure interferometric radio occultation may be obtained are indicated by reference numbers 1140A, 1140B. Ranges of orbital positions of (GNSS) satellites at which the reference signal (e.g., first signal) in top of the atmosphere interferometric radio occultation may be obtained are indicated by reference numbers 1150A, 1150B. Lastly, ranges of orbital positions of (GNSS) satellites at which the reference signal (e.g., first signal) in zenithal interferometric radio occultation may be obtained are indicated by reference number 1160.

Broadly speaking, the present disclosure may be summarized as follows. This paper has presented a new technique to perform radio occultation based on the periodicity of the acquisition codes present in all GNSS navigation signals. The proposed approach involves performing the complex auto-correlation of the received signal at a multiple number of periods of those codes, instead of cross-correlating it with a local signal model (clean replica), and hence is referred to as interferometric radio occultation. For the same integration time, which must be a multiple of the acquisition code period, the interferometric technique provides exactly the same Doppler observations as the approach of Equation [1] through [14].

Critical parameters of the new approach include the SNR, the effect of clock drift and phase noise, and satellite discrimination. The SNR of the interferometric radio occultation technique may be comparatively low in the lower part of the troposphere. Zenithal interferometric radio occultation which involves acquiring the reference signal either at the top of the atmosphere, or, using an up-looking antenna, at high elevation angle may satisfactorily address this issue. This implementation of the proposed approach can achieve, with an aperture of 0.89 m, similar SNR as typical instruments using the approach of Equations [1] through [14]. Additionally, the zenithal and top of the atmosphere acquisitions of the reference signal introduce satellite discrimination capability through geometry, delay and Doppler.

The interferometric radio occultation method, in its different implementations may be advantageously used as an add-on to an interferometric GNSS reflectometry instrument, as it could be readily implemented using the same electronics. The new radio occultation technique may be implemented e.g., with ESA's upcoming GEROS-ISS experiment.

While the above disclosure frequently refers to LEO satellites for carrying the receiver and to GNSS satellites for transmitting the signals received at the receiver, the present disclosure is not limited to LEO satellites and/or GNSS satellites.

It should be noted that the apparatus and system features described above correspond to respective method features that may not be explicitly described, for reasons of conciseness, and vice versa. The disclosure of the present document is considered to extend also to such method features, and vice versa.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

The invention claimed is:

1. A method of performing radio occultation for inferring physical properties of a portion of atmosphere, the method comprising:
   receiving, at a receiver aboard a satellite, a first signal from another satellite at a first timing;
   receiving, at the receiver, a second signal from the other satellite at a second timing different from the first timing;
   correlating, by a computation unit comprising processing circuitry, the first signal with the second signal; and
   determining, by the computation unit, a first quantity indicative of a path delay between the first signal and the second signal resulting from at least one of the first signal and the second signal having passed through the portion of atmosphere between transmission by the other satellite and reception at the receiver, based on a result of the correlation.

2. The method according to claim 1, wherein at least one of the first timing and the second timing is a timing at which the other satellite is in occultation by the portion of atmosphere with respect to the receiver.

3. The method according to claim 1, further comprising:
   determining a delay value for which a correlation function of the first signal and the second signal attains its peak value; and
   determining the first quantity based on the determined delay value.

4. The method according to claim 1, further comprising:
   determining, by the computation unit, a second quantity indicative of a Doppler shift resulting from at least one of the first signal and the second signal having passed through the portion of atmosphere between transmission by the other satellite and reception at the receiver, based on the determined first quantity.

5. The method according to claim 1, further comprising:
   determining, by the computation unit, a third quantity indicative of the excess Doppler shift between the first signal and the second signal based on the determined first quantity and a modelled value of the Doppler shift.

6. The method according to claim 1, wherein both the first timing and the second timing are timings at which the other satellite is in occultation by the portion of atmosphere with respect to the receiver.

7. The method according to claim 1, wherein one of the first timing and the second timing is a timing at which the other satellite is at a substantially zenithal position with respect to the receiver, and the other one of the first timing and the second timing is a timing at which the other satellite is in occultation by the portion of atmosphere with respect to the receiver.

8. The method according to claim 1, wherein one of the first timing and the second timing is a timing at which the other satellite is on the point of entering or leaving occultation by the atmosphere with respect to the receiver, and the other one of the first timing and the second timing is a timing at which the other satellite is in occultation by the portion of atmosphere with respect to the receiver.

9. The method according to claim 1, wherein signals transmitted by the other satellite include a specific code having a predetermined repetition period; and
   in the correlation step, time integration is performed over an integration length corresponding to an integer multiple of the predetermined repetition period.

10. The method according to the claim 9, wherein the first timing and the second timing are offset from each other substantially by an integer multiple of the predetermined repetition period.

11. A system for performing radio occultation for inferring physical properties of a portion of atmosphere, the system comprising:
    a receiver aboard a satellite for receiving a first signal from another satellite at a first timing and for receiving a second signal from the other satellite at a second timing different from the first timing; and
    a computation unit configured to:
      correlate the first signal with the second signal; and
      determine a first quantity indicative of a path delay between the first signal and the second signal resulting from at least one of the first signal and the second signal having passed through the portion of atmosphere between transmission by the other satellite and reception at the receiver, based on a result of the correlation.

12. The system according to claim 11, wherein at least one of the first timing and the second timing is a timing at which the other satellite is in occultation by the portion of atmosphere with respect to the receiver.

13. The system according to claim 11, wherein the computation unit is further configured to:
    determine a delay value for which a correlation function of the first signal and the second signal attains its peak value; and
    determine the first quantity based on the determined delay value.

14. The system according to claim 11, wherein the computation unit is further configured to:
    determine a second quantity indicative of a Doppler shift resulting from at least one of the first signal and the second signal having passed through the portion of atmosphere between transmission by the other satellite and reception at the receiver, based on the determined first quantity.

15. The system according to claim 11, wherein the computation unit is further configured to:
    determine a third quantity indicative of the excess Doppler shift between the first signal and the second signal based on the determined first quantity and a modelled value of the Doppler shift.

16. The system according to claim 11, wherein both the first timing and the second timing are timings at which the other satellite is in occultation by the portion of atmosphere with respect to the receiver.

17. The system according to claim 11, wherein one of the first timing and the second timing is a timing at which the other satellite is at a substantially zenithal position with respect to the receiver, and the other one of the first timing and the second timing is a timing at which the other satellite is in occultation by the portion of atmosphere with respect to the receiver.

18. The system according to claim 11, wherein one of the first timing and the second timing is a timing at which the other satellite is on the point of entering or leaving occultation by the atmosphere with respect to the receiver, and the other one of the first timing and the second timing is a timing at which the other satellite is in occultation by the portion of atmosphere with respect to the receiver.

19. The system according to claim 11, wherein signals transmitted by the other satellite include a specific code having a predetermined repetition period; and the computation unit is further configured to perform time integration in the correlation over an integration length corresponding to an integer multiple of the predetermined repetition period.

20. The system according to the claim 19, wherein the first timing and the second timing are offset from each other substantially by an integer multiple of the predetermined repetition period.

* * * * *